United States Patent
Itokawa

(10) Patent No.: US 8,125,521 B2
(45) Date of Patent: Feb. 28, 2012

(54) MULTIPLE IMAGE PROCESSING AND SYNTHESIS USING BACKGROUND IMAGE EXTRACTION

(75) Inventor: Osamu Itokawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1198 days.

(21) Appl. No.: 11/898,804

(22) Filed: Sep. 17, 2007

(65) Prior Publication Data

US 2008/0212878 A1 Sep. 4, 2008

Related U.S. Application Data

(62) Division of application No. 10/460,230, filed on Jun. 13, 2003, now Pat. No. 7,292,264.

(30) Foreign Application Priority Data

Jun. 14, 2002 (JP) .................. 2002-174347

(51) Int. Cl.
*H04N 7/18* (2006.01)

(52) U.S. Cl. ............ 348/143; 348/211.9; 348/152; 348/153; 348/159; 375/240.08; 375/240.24; 375/240.25; 375/240.26; 375/240.28; 382/233; 382/235; 382/190; 382/195; 382/206; 382/243; 382/199; 382/201

(58) Field of Classification Search .......... 348/143, 348/211.9, 152–153, 159; 375/240.08, 240.24, 375/240.25, 240.26, 240.28; 382/233, 235, 190, 195, 206, 243, 199, 201

See application file for complete search history.

(56) References Cited

U.S. PATENT DOCUMENTS

| | | | | |
|---|---|---|---|---|
| 6,424,373 | B1 | 7/2002 | Misue et al. | 348/211.99 |
| 6,813,388 | B2 * | 11/2004 | Kadono | 382/243 |
| 6,909,747 | B2 * | 6/2005 | Bordes et al. | 375/240.12 |
| 6,977,676 | B1 | 12/2005 | Sato et al. | 348/211.11 |
| 6,987,535 | B1 * | 1/2006 | Matsugu et al. | 348/239 |

FOREIGN PATENT DOCUMENTS

| | | |
|---|---|---|
| JP | 2000-32319 | 1/2000 |
| JP | 2000-295600 | 10/2000 |

* cited by examiner

*Primary Examiner* — Shawn An
(74) *Attorney, Agent, or Firm* — Fitzpatrick, Cella, Harper & Scinto

(57) ABSTRACT

A technique of efficiently extracting and synthesizing an object image from a plurality of images captured at different image magnifications. An image processing method of the present invention includes the steps of generating a first background image corresponding to a first image captured at a predetermined image magnification, extracting a first object image from the first image, generating a second background image corresponding to a second image captured at an image magnification higher than the predetermined image magnification, based on the first background image and the first object image, and extracting a second object image from the second image and the second background image.

9 Claims, 18 Drawing Sheets

1303

1303

1303

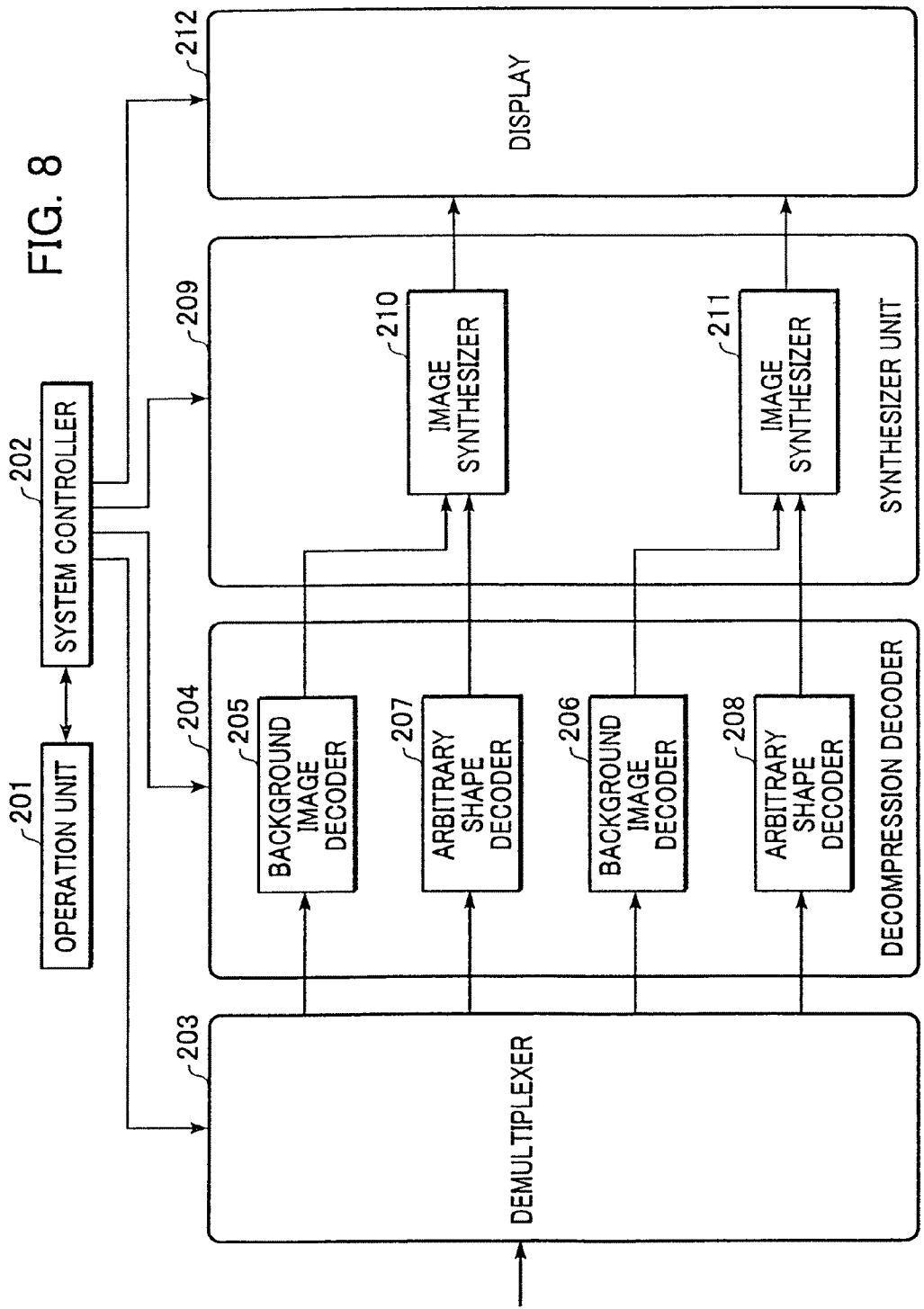

MULTIPLE IMAGE PROCESSING AND SYNTHESIS USING BACKGROUND IMAGE EXTRACTION

This application is a divisional of application Ser. No. 10/460,230, filed Jun. 13, 2003, now allowed, the contents of which are incorporated by reference herein.

BACKGROUND OF THE INVENTION

1. Field of the Invention

The present invention relates to an image processing method, image processing apparatus, computer program, and computer readable storage medium and, more particularly, to a technique for processing a plurality of pieces of image data captured at different image magnifications.

2. Description of the Related Art

A variety of surveillance systems based on an image provided by an image pickup device have been proposed, such as surveillance systems using a wide-angle lens such as a fisheye lens.

The advantages of the surveillance system using the wide-angle lens are that a single image pickup device monitors a wide area in a single captured image and that the cost required for the investment of the image pickup device per surveillance area is low. The surveillance system reliably captures an image of any trespasser in a wide surveillance area and helps a user to easily recognize the position of the trespasser.

FIG. 1 illustrates an office in which a single wide-angle camera 1301 mounted on a high place in the office monitors a relatively wide surveillance area 1302.

A trespasser 1303 is now entering the office. Because of the wide surveillance area of the wide-angle camera 1301, the system can view many office instruments such as desks and doors in addition to the incoming trespasser 1303 in the same image. A user immediately visibly recognizes the position of the trespasser 1303. The system keeps the moving trespasser 1303 within the wide field of view thereof. It is difficult for the trespasser 1303 to disappear from the field of view.

A surveillance system employing a wide-angle lens with a 360 degree full circle surveillance capability has been proposed. Such a system incorporates an optical mirror element in an image pickup system and employs a technique that corrects, through image processing, distortion of a captured image that becomes larger as the image pickup optical system has a wider field of view.

Although the wide-angle lens surveillance system has the above-mentioned advantages, the image of the trespasser 1303 in the wide surveillance area becomes smaller and more difficult to identify.

FIG. 2 shows one scene of the video taken by the wide-angle camera 1301 where the trespasser 1303 enters the office. As shown in FIG. 2, the wider the surveillance area, the more easily the user recognizes the position of the trespasser 1303. However, it is more difficult for the user to recognize the details, such as the face, expression, and appearance of the trespasser 1303.

FIG. 3 illustrates another such a surveillance system. The surveillance area 1302 monitored by the wide-angle camera 1301 illustrated in FIG. 1 is segmented into three surveillance areas. The three surveillance areas are respectively monitored by three cameras 1501, each having a standard lens.

The three cameras 1501 independently monitor the respective surveillance areas (a surveillance area 1502, for example), and captured images are then presented on respective monitors on a one camera to one video screen basis. Some controllers receive videos from a plurality of cameras in a multi-channel input port, and then present the videos on a multi-window screen on a single monitor.

When a trespasser 1303 comes into the office, one of the three cameras (a center camera) shown in FIG. 3 captures the image of the trespasser 1303, and a monitor linked to the center camera presents a screen shown in FIG. 4. The screen shown in FIG. 4 may be the one presented on one channel of multi-channel video from the three cameras.

A comparison of FIG. 4 with FIG. 2 reveals that the surveillance system shown in FIG. 4 monitors the image of the trespasser 1303 in a larger size, and outperforms the wide-angle lens surveillance system shown in FIG. 2 in the recognition of details, such as the face, expression, and appearance of the trespasser 1303.

A user (such as a security guard) of the surveillance system must view a plurality of monitors or a multi-window screen at a time.

Japanese Patent Laid-Open No. 2000-295600 discloses a technique to overcome this problem. According to the disclosure, a plurality of cameras are used to monitor a surveillance area. If a moving object is detected from a video, video containing the moving object is presented on a single monitor.

FIG. 5 illustrates another surveillance system, disclosed in Japanese Patent Laid-Open No. 2000-32319. A camera 1701, which may be panned, tilted, and zoomed to change the field of view (here simply referred to as a zoom camera), is installed in addition to the wide-angle camera 1301 in the office illustrated in FIG. 1. The wide-angle camera 1301 monitors a wide area while the zoom camera 1701 takes an expanded image that presents more clearly the face and appearance of the trespasser 1303.

FIGS. 6A and 6B illustrate an image captured by the wide-angle camera 1301, and the zoom camera 1701, respectively, shown in FIG. 5.

FIG. 6A illustrates an image captured by the wide-angle camera 1301 and is identical to the image illustrated in FIG. 2. FIG. 6B illustrates an image captured by the zoom camera 1701. As with the surveillance system having a plurality of image pickup devices, this surveillance system may present images on monitors respectively linked with cameras, or a multi-window screen on a single monitor using a multi-channel controller.

This system advantageously satisfies one requirement that the position of the trespasser is easily recognized in a wide-angle surveillance image provided by the wide-angle lens camera, and another requirement that the face, expression, and appearance of the trespasser are clearly viewed in an expanded image of the zoom camera.

Japanese Patent Laid-Open No. 2000-32319 discloses a system in which images captured by a wide-angle camera and a zoom camera are transferred and displayed on an apparatus connected to a network. Also proposed in the same disclosure is a surveillance system in which a user watches an image on the wide-angle camera while watching an expanded image of a desired object by operating the apparatus to pan, tilt, and zoom the zoom camera at the same time.

Rather than manually operating a zoom camera, Japanese Patent Laid-Open No. 2000-295200 discloses a surveillance system which automatically detects a moving object from a wide-angle image, and automatically pans, tilts, or zooms the zoom camera in response to a position and a size of the moving object to obtain an expanded image of the moving object.

The foregoing conventional methods have the following problems.

In the surveillance system using the wide-angle lens such as a fisheye lens, the size of the image of the trespasser is small with respect to the surveillance area image and the user has difficulty in recognizing the details of the trespasser, such as the face. When the trespasser is detected, the area of the trespasser is expanded by performing an expansion and interpolation process on a digital image. However, since the amount of information (a frequency component in the image) present in the image is determined during sampling, the amount of information is not increased subsequent to the expansion process.

In other words, the expansion process does not show any detail if it has been invisible in the image prior to the expansion process. Since an apparent frequency component of the image shifts to a lower frequency with the expansion rate, an expanded image becomes simply blurred. If no interpolation process is performed, the image typically becomes a block-mosaic image.

Japanese Patent Laid-Open No. 2000-295600 discloses an improved manner of presenting the image to ease the fatigue of the security guard who must continuously view the image. As the surveillance area becomes wide, more cameras are required, and costs increase.

The security guard or other user may have difficulty in discerning the position of a trespasser because each camera has a small surveillance area. As the trespasser moves, the system switches from one camera to another to keep the trespasser to within the field of view with each camera covering a different surveillance area. In this arrangement, the user may have difficulty in identifying the trespasser. The disclosure mentions a method of obtaining an expanded image by image processing a pickup image from the camera. For this reason, a great deal of effort is required to construct an appropriate environment including the maximum effective expansion rate effective for recognizing the object image, focal length of the camera (or the field of view), and distance between installed cameras, depending on monitoring positions and recognition precision in identifying the trespasser.

Although the surveillance system employing a plurality of cameras having different image magnifications optically overcomes the drawbacks of the conventional art, two video signals, one from the wide-angle camera and the other from the zoom camera, must be transmitted to the network, requiring a large amount of bandwidth.

As in FIG. 2 and FIG. 6A, most of the video from the wide angle camera, except of course for the trespasser, does not change, even during the trespassing, and thus many image frames are transmitted redundantly. There is room for improvement in terms of effective and efficient video transmission.

From this standpoint, Japanese Patent Laid-Open No. 2000-32319 sets a frame rate for transmitting a zoom camera expanded video to be higher than a frame rate for transmitting a wide-angle camera video so that the zoom camera expanded image moves more smoothly. This is because the zoom camera expanded image is considered more important than the wide-angle camera image. However, the reduction of the frame rate of the wide-angle camera video negatively affects some frames imaging the action of the trespasser, leading to a problem in as a surveillance system.

In particular, a criminal act is typically performed very quickly. The reduction of the frame rate may eliminate frames, which could otherwise become an important evidence later.

In the surveillance system having a plurality of cameras having different image magnifications, the background images must be prepared beforehand to extract an object image. As discussed in Japanese Patent Laid-Open No. 2000-295600 to effectively extract an object image, motion must be detected. It is difficult to efficiently extract a target object image from multiple streams of video, since a captured background image may have an image magnification different from a desired image magnification. Therefore, extracting a desired image of an object at a desired magnification can be difficult to obtain.

SUMMARY OF THE INVENTION

It is one object of the present invention to provide an image processing method, image processing apparatus, computer program and computer readable storage medium for easily and efficiently extracting a particular image from a plurality of pieces of video data captured at different image magnifications.

It is another object of the present invention to provide an image processing method, image processing apparatus, computer program and computer readable storage medium for easily and efficiently generating a background image captured at an image magnification higher than a predetermined image magnification from video data that is captured at the predetermined image magnification.

It is yet another object of the present invention to provide a method and apparatus for easily obtaining an expanded image.

In a first aspect of the present invention, an image processing apparatus includes a first background image generator for generating a first background image corresponding to a first pickup image captured at a predetermined image magnification, a first object image extractor for extracting a first object image from the first pickup image, a second background image generator for generating a second background image corresponding to a second pickup image captured at an image magnification higher than the predetermined image magnification, based on the first background image and the first object image, and a second object image extractor for extracting a second object image from the second pickup image and the second background image.

In a second aspect of the present invention, an image processing apparatus of the present invention includes an input unit for inputting a first background image captured at a predetermined image magnification, a first object image extracted from image data captured at the predetermined image magnification, and a second object image extracted from image data captured at an image magnification higher than the predetermined image magnification, a background image generator for generating a second background image corresponding to the second object image based on the first background image and the first object image, and an image synthesizer for synthesizing the second background image and the second object image.

Further objects, features, and advantages of the present invention will be apparent from the following description of the preferred embodiments with reference to the attached drawings.

BRIEF DESCRIPTION OF THE DRAWINGS

FIG. 8 is a block diagram of an image decoder of the surveillance system in accordance with the first embodiment of the present invention.

DESCRIPTION OF THE PREFERRED EMBODIMENTS

Figure 1:
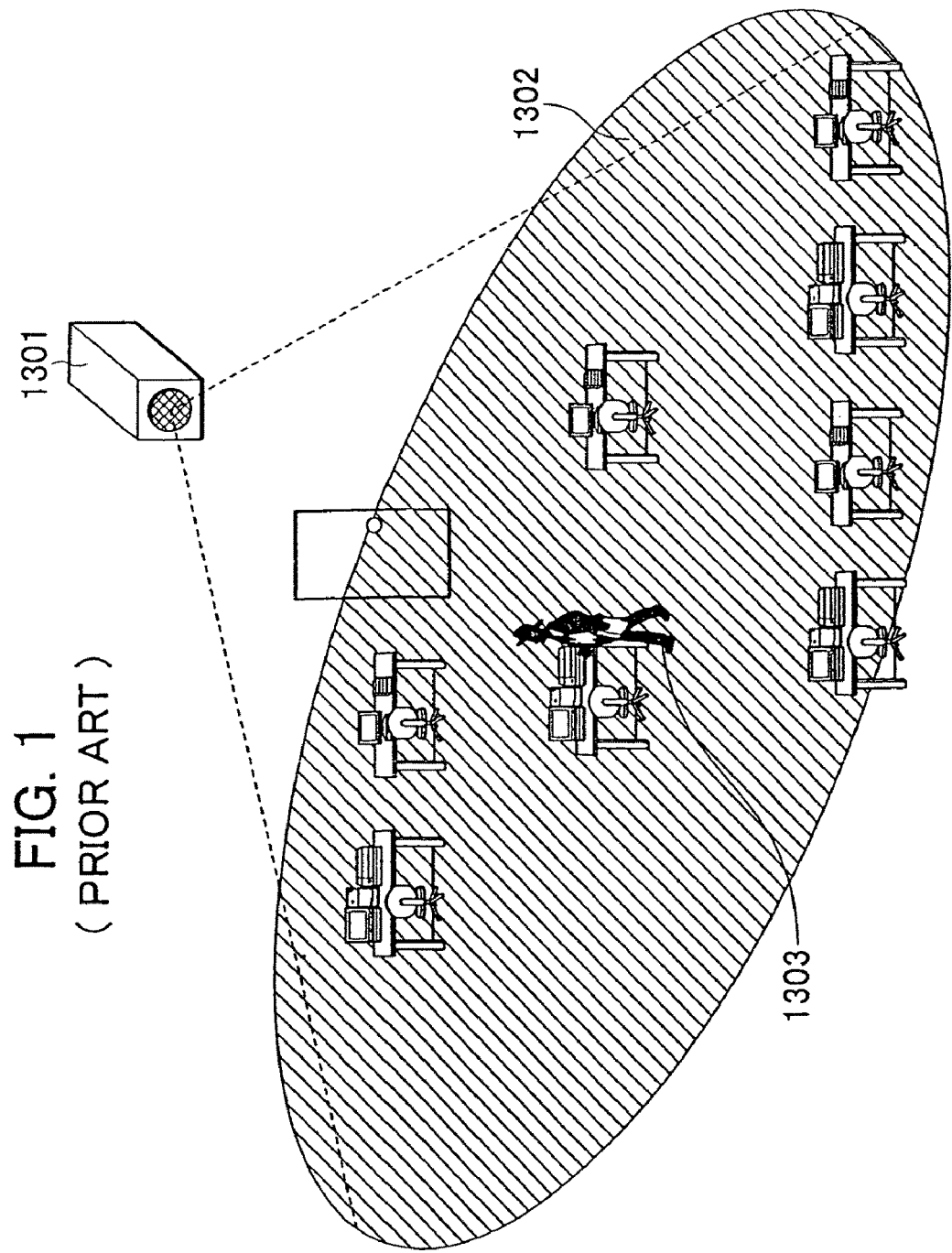
FIG. 1 shows a conventional surveillance system using a wide-angle camera.
Figure 2:
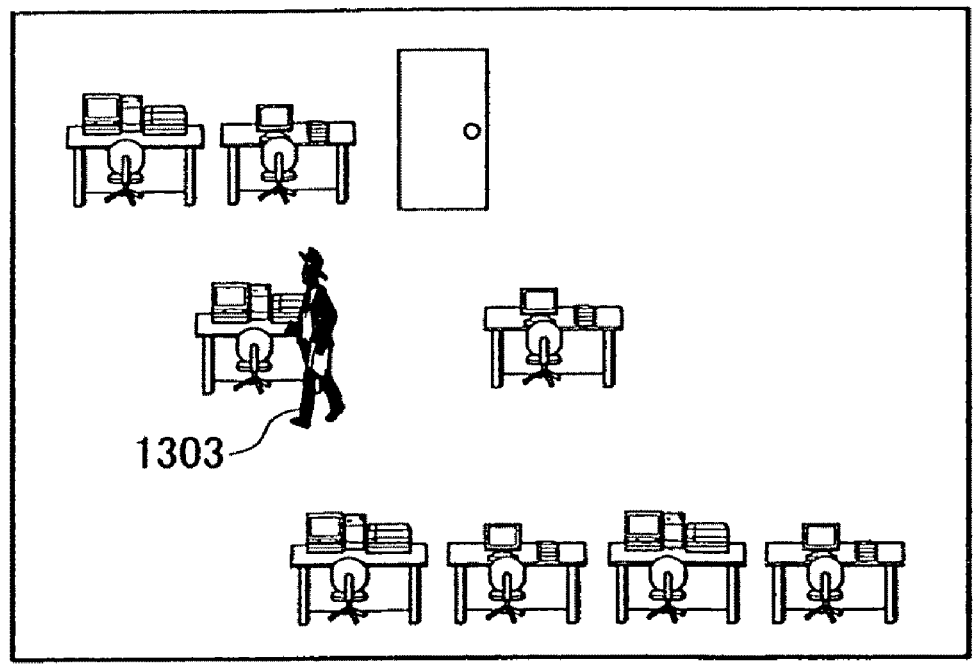
FIG. 2 shows an image captured by the surveillance system of FIG. 1.
Figure 3:
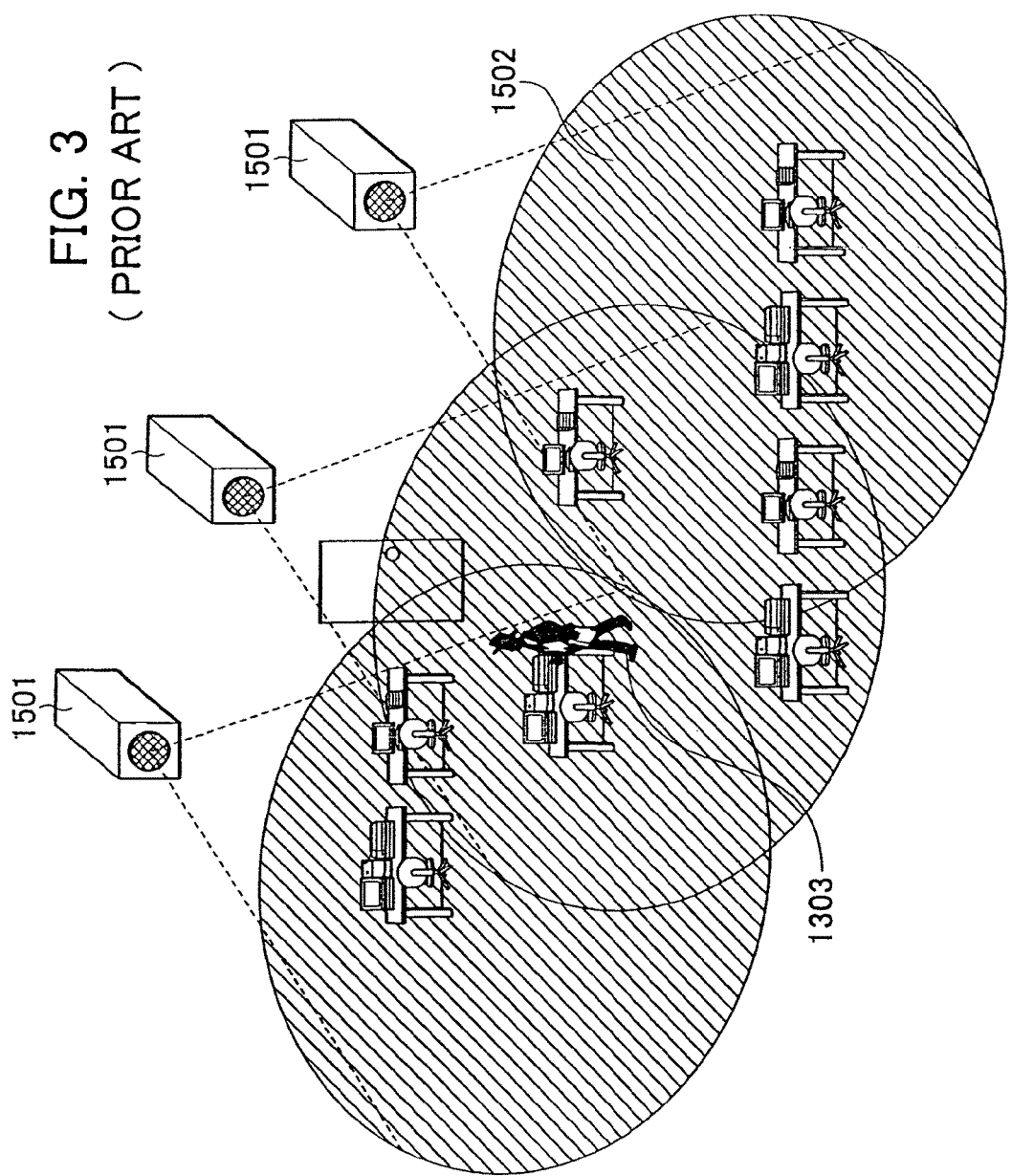
FIG. 3 shows a conventional surveillance system employing a plurality of standard cameras.
Figure 4:
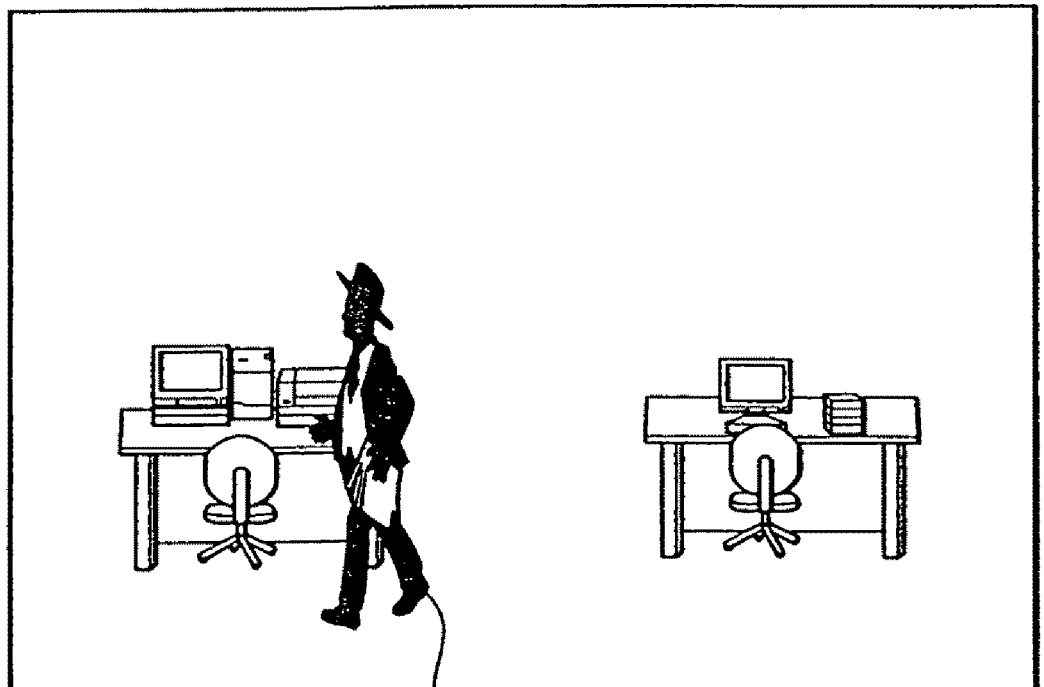
FIG. 4 shows an image captured by the surveillance system of FIG. 3.
Figure 5:
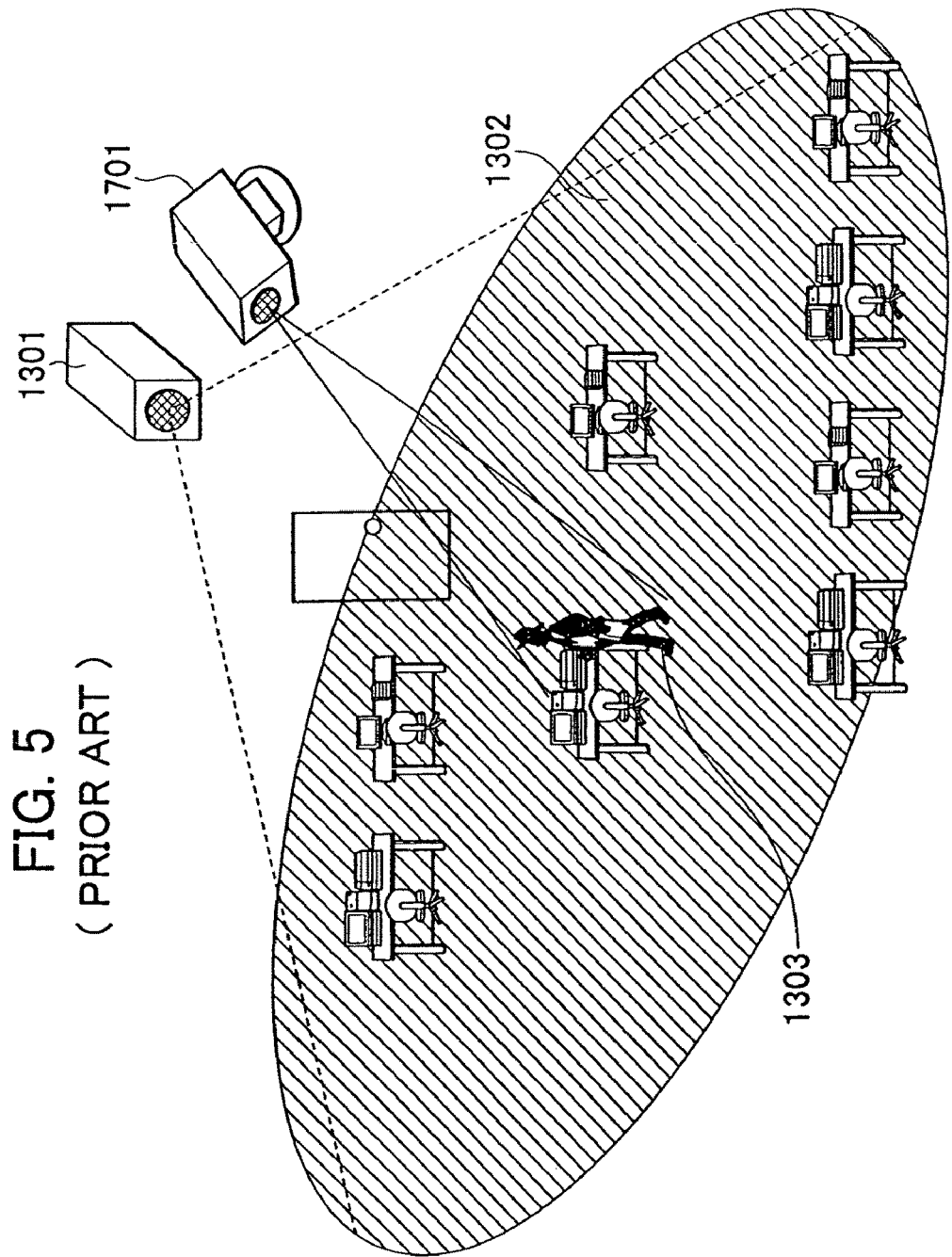
FIG. 5 shows a conventional surveillance system employing a wide-angle camera and a zoom camera.
Figure 6A:
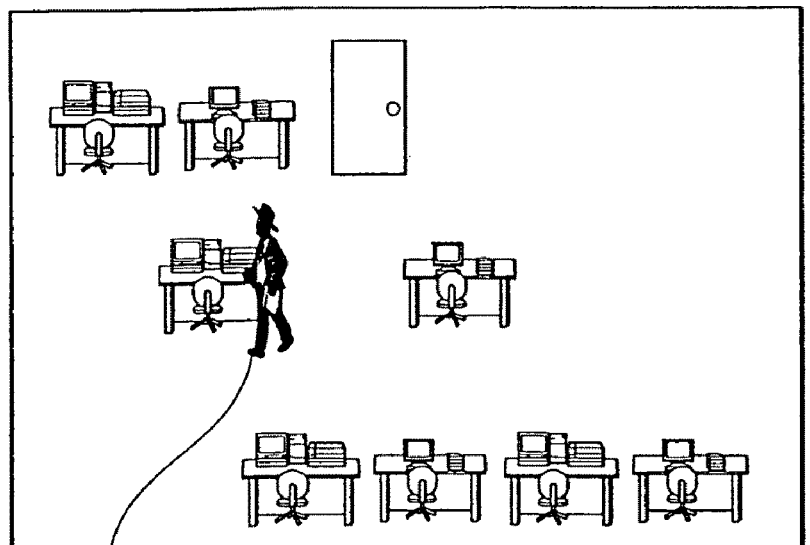
FIGS. 6A and 6B show images captured by the surveillance system of FIG. 5.
Figure 6B:
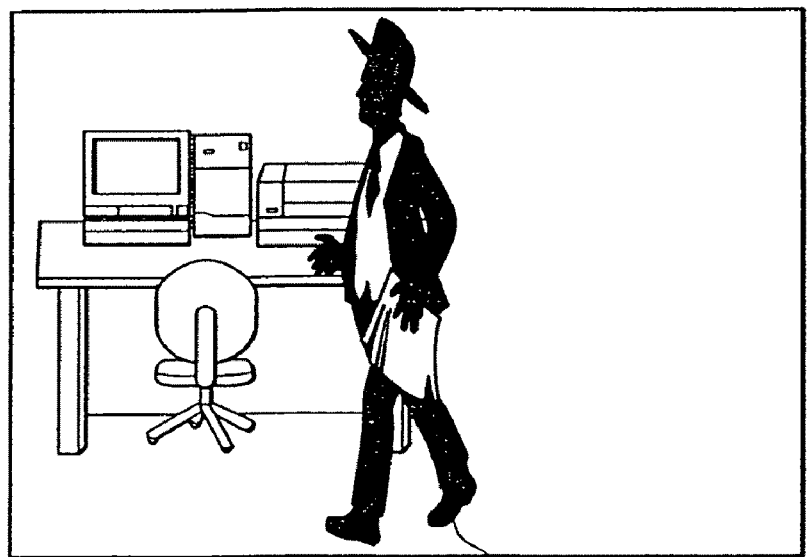
Figure 7:
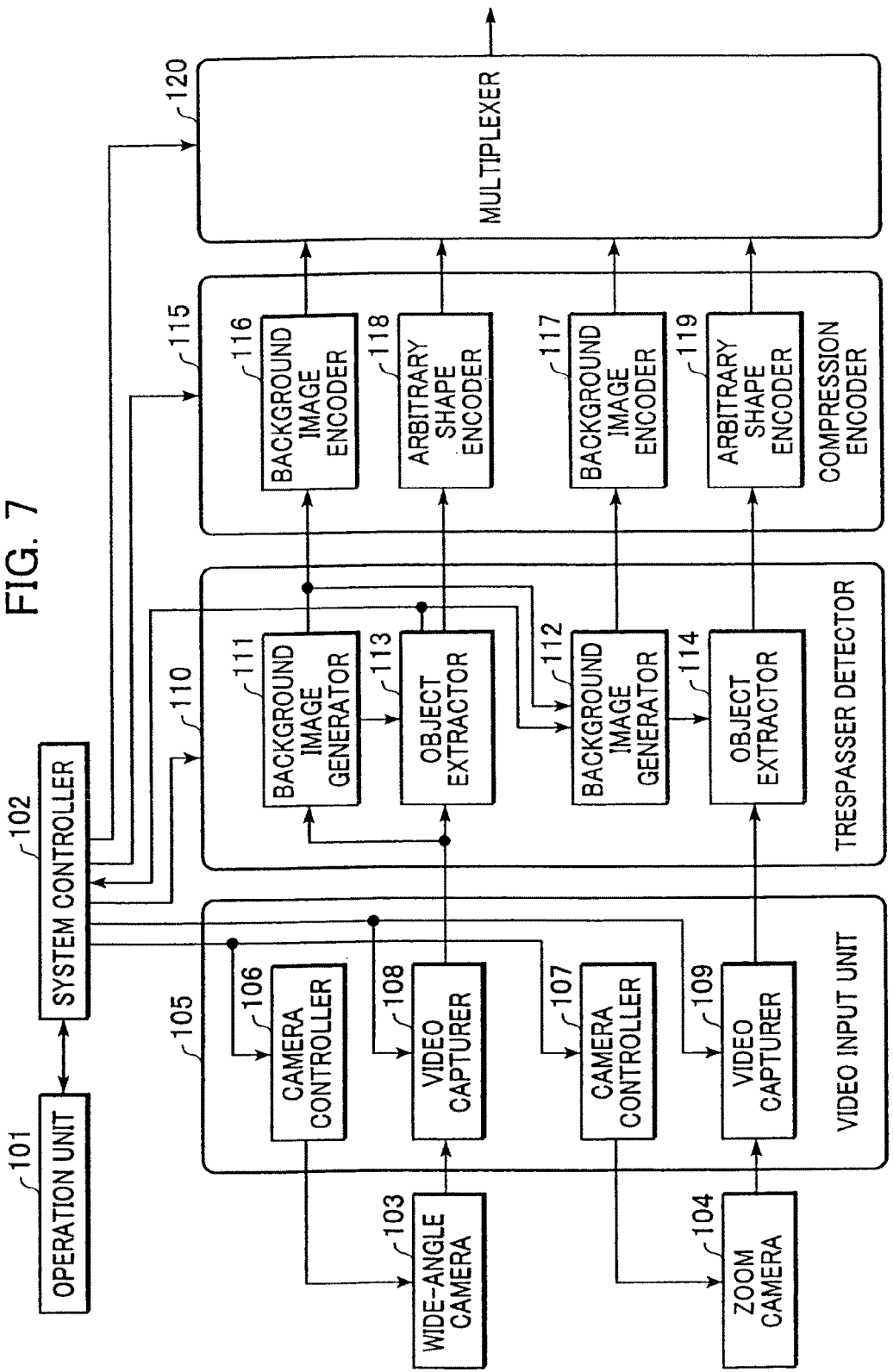
FIG. 7 is a block diagram of an image encoder of a surveillance system in accordance with the first embodiment of the present invention.

FIG. 7 is a block diagram of an image encoder of a surveillance system in accordance with a first embodiment of the present invention. FIG. 8 is a block diagram of an image receiver which decodes a video signal and outputs the decoded video signal to a display. The details of the image receiver will be discussed later with reference to FIG. 8.

Referring to FIG. 7, an operation unit 101 includes a user interface of a surveillance system of the first embodiment. A user, such as a security guard, controls the surveillance system by entering a start command, an end command, etc., to the operation unit 101.

A system controller 102 generally controls the surveillance system. In response to commands from the operation unit 101, the system controller 102 generally controls each block of the surveillance system, and coordinates the time-coding of a video signal.

A wide-angle camera 103 captures an image of a preset surveillance area. The wide-angle camera 103 monitors a relatively wide surveillance area, and includes, in addition to a wide-angle lens used in this camera, a full-circle image pickup optical system including a fisheye lens, a super wide-angle lens, and an mirror optical element.

A zoom camera 104 has an image magnification higher than that of the wide-angle camera 103, and is provided with a zoom function sufficient enough to magnify image, particularly, a trespasser coming into a surveillance area. The zoom camera 104 is equipped with a panhead which is panned and tilted to automatically track the trespasser. The zoom camera 104 keeps the trespasser within the field of view by aiming the optical axis at the position of the trespasser.

A video input unit 105 receives video signals from the wide-angle camera 103 and zoom camera 104. The video input unit 105 includes a camera controller 106 for controlling and setting camera photography conditions of the wide-angle camera 103, camera controller 107 for controlling and setting camera photography conditions of the zoom camera 104, video capturers 108 and 109 which convert video signal outputs from the wide-angle camera 103 and zoom camera 104 respectively, into a video signal such as an RGB, 24-bit digital video signal.

A trespasser detector 110 includes a background image generator 111 and object image extractor 113 for the wide-angle camera 103, and background image generator 112 and object image extractor 114 for the zoom camera 104.

The background image generator 111 for the wide-angle camera 103 generates and stores an image, in a normal state prior to the appearance of a trespasser, as a background image. The object image extractor 113 for the wide-angle camera 103 detects the presence of the trespasser by comparing the preceding background image with an input image, alerts a watcher, and outputs information to be used to allow the zoom camera 104 to track the trespasser.

The background image generator 112 for the zoom camera 104 generates a background image of the zoom camera 104, based on the background image generated by the wide-angle camera 103 and an object image extracted by the object image extractor 113. The object image extractor 114 for the zoom camera 104 extracts an expanded image of the trespasser by comparing an input image from the zoom camera 104 with the preceding background image.

Background image encoders 116 and 117 compress and encode the background still images. The encoding method of the background image encoders 116 and 117 may be JPEG (Joint Photographic Experts Group ISO/IEC 10918) or JPEG2000 for still picture compression standardized by the ISO/IEC, or sprite encoding of MPEG (Moving Picture Experts Group)-4 (ISO/IEC14496). MPEG-2 (ISO/IEC13818) for moving picture encoding method, which is standardized by the ISO/IEC, may be used when there is only one frame.

Arbitrary shape encoders 118 and 119 encode an arbitrary shape element (object) only from an entire video such as a video frame. The arbitrary shape encoders 118 and 119 use the MPEG-4 object unit encoding method standardized by the ISO/IEC. The first embodiment will be specifically discussed with reference to MPEG-4, although the present invention is not limited to MPEG-4. Any encoding method is perfectly acceptable as long as the encoding method encodes the image on an object unit basis.

A mutliplexer 120 multiplexes a plurality of compression encoded bit-streams. In a storage system, the multiplexed bit stream is converted into an appropriate file format, and is then stored into a storage medium such as a hard disk, VCR, or CD-R. In a transmission system, the multiplexed bit stream is segmented into packets, which are then transmitted to a network.

An operation of the surveillance system constructed as shown in FIG. 7 will now be discussed.

The wide-angle camera 103 and zoom camera 104 are installed in a room at a predetermined position in a high vantage point which commands a general view of the room. In particular, the wide-angle camera 103 is adjusted in the optical axis thereof and image magnification thereof so that a desired surveillance area is imaged. Default settings, discussed herein, required to estimate the position of an object are performed at the installation of the surveillance system. In response to a command of a user, the surveillance system is immediately activated.

When a surveillance system operation switch (not shown) of the operation unit 101 is turned on, the system controller 102 issues a default command to associated units. For example, the camera controllers 106 and 107, which have received the command, respectively power on the wide-angle camera 103 and zoom camera 104, and default automatic exposure (AE), automatic focus (AF), automatic white balancing (AWB), automatic gain control (AGC), in the respective cameras. The camera controller 107 controls the zoom camera 104 so that the zoom camera 104 is panned, tilted, and zoomed at a predetermined default optical axis direction and default image magnification.

When the trespasser detector 110 is initialized, the background image generator 111 stores beforehand one frame of image of the empty surveillance area of the wide-angle camera 103. Preferably, pickup images captured for a brief period of time are averaged and stored to reduce the effect of CCD noise.

Since the background image generator 112 for the zoom camera 104 starts operating after a trespasser is detected, the background image generator 112 does not need default setting equivalent to the default setting performed on the background image generator 111 for the wide-angle camera 103.

For a duration of time from the default setting until the poweroff of the system operation, a synchronization signal flows in the entire surveillance system, thereby performing timing adjustment for multiplexing video signals from a plurality of cameras.

When the initialization of the system is complete, the system controller 102 starts a surveillance operation. The system controller 102 commands the video input unit 105 to image capture the surveillance area through the cameras and trespasser detector 110 to start the detection of a trespasser from the captured image.

The surveillance system works in two modes: a "normal mode" which indicates a normal state that no trespasser is present in the surveillance area, and a "trespasser tracking mode" which indicates a triggered state in which a trespasser is present within the background image and that the action of a trespasser needs to be tracked. The extraction result of the object image extractor 113 for the wide-angle camera 103 in the trespasser detector 110 is used to determine which of the "normal mode" and the "trespasser tracking mode" the system is in. The indication of the current mode is transferred to the system controller 102. In response to each of the two surveillance modes, the system controller 102 controls the blocks of the surveillance system.

The camera controller 106, which has received a surveillance start command from the system controller 102, causes the wide-angle camera 103 to start image capturing using default settings. The video capturer 108 then converts the pickup image into an RGB 24-bit format digital signal on a frame-by-frame basis, which is then fed to the object image extractor 113 for the wide-angle camera 103.

On the other hand, the zoom camera 104 starts image capturing in the default setting. The video capturer 109 converts the pickup image into an RGB 24-bit format digital image on a frame by frame basis as in the wide-angle camera 103. The image of the video capturer 109 is not output to the object image extractor 114 until the trespasser tracking mode is triggered.

When the trespasser tracking mode is triggered, data relating to the control of the zoom camera 104 is sent to the camera controller 107 from the object image extractor 113 on the side of the wide-angle camera 103 through the system controller 102. When the camera controller 107 takes the image of a trespasser through the zoom camera 104, the captured image is output to the object image extractor 114 for the zoom camera 104.

Figure 9A:
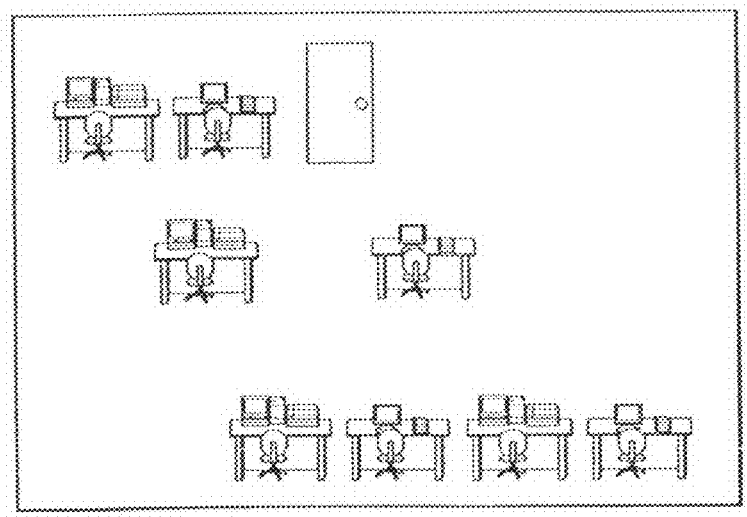
FIGS. 9A-9C show an object extraction process in accordance with the first embodiment of the present invention.
Figure 9B:
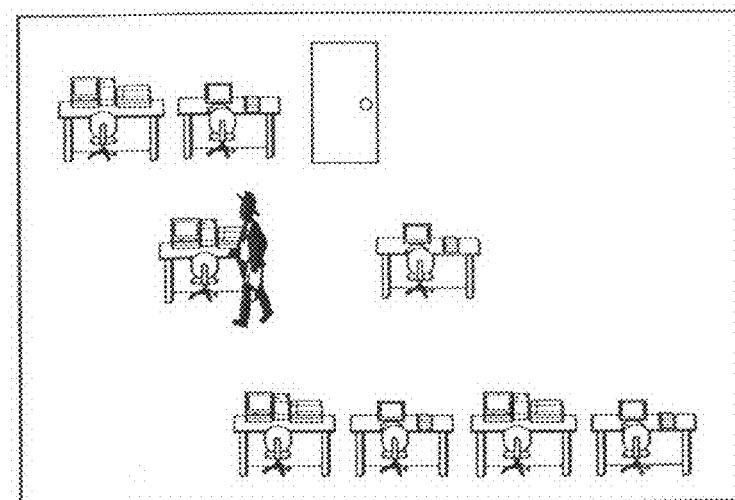
Figure 9C:
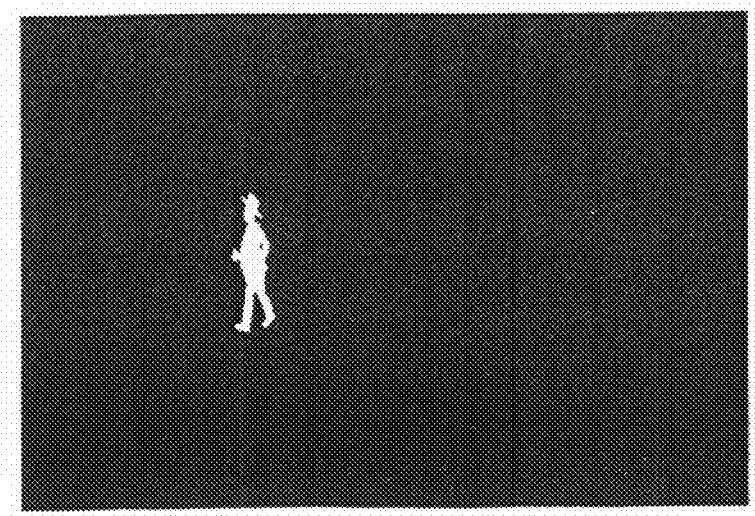

An object extraction method carried out by the object image extractors 113 and 114 is discussed below. In the first embodiment, a method called "background difference method" is used to extract an object. Referring to FIGS. 9A-9C, the background difference method is discussed.

FIGS. 9A-9C illustrate an object extraction method in accordance with the first embodiment of the present invention.

FIG. 9A illustrates an empty image of an office taken by a camera. The image corresponds to an image of a surveillance system captured by the wide-angle camera 103. The surveillance image is in the normal mode with no trespasser present.

In the background difference method, a video having no moving object (no trespasser) within is stored as a reference background image. In the first embodiment, the background image is stored in an internal memory in the background image generator 111.

In the background difference method, a difference between a target image and a reference background image is determined to find an area in the target image different from the background image. If the background difference method is applied to the first embodiment, the system calculates a difference between the target image by the wide-angle camera 103 and the simultaneously captured background image in frame coordinates corresponding to those of the real-time video on a frame by frame basis.

If no trespasser is present in the surveillance area (see FIG. 9A), there is no difference between the real-time framed video (the target image) and the background image, and interframe difference is almost zero if the effect of noise is removed.

If a trespasser is present in the surveillance area (see FIG. 9B), an area of the trespasser in the target image has a signal value different from that of the background image.

If the difference is expressed using equations, $$d = \{Ir(x,y) - Ib(x,y)\}^2 \quad (1)$$

$$b(x,y) = 0 \text{ (if } d < Th\text{) or } b(x,y) = 1 \text{ (if } d \geq Th\text{)} \quad (2)$$

where $Ir(x,y)$ represents a signal value at coordinates $(x,y)$ in the target image, $Ib(x,y)$ is a signal value at the coordinates $(x,y)$ in the background image, Th represents a predetermined threshold, and $b(x,y)$ represents a bit-map plane.

Equation (1) calculates the square of the difference between the target image and the background image to set all results to have a positive sign. Instead of calculating the square of the difference, a sign bit of d representing a digital signal is masked and the absolute value of the difference $|Ir(x,y) - Ib(x,y)|$ is used.

In equation (2), the difference is treated as zero if the difference is smaller than the threshold. This operation is intended to remove the effect of noise contained in the image. Equation (2) also presents a robustness to variations in an environment due to illumination for example, until a next image is captured. For example, if a variation in the intensity of sunlight due to the shadow of clouds sets a current image to be darker than the background image, the threshold Th serves the purpose of not regarding the variation as an incoming object.

Equations (1) and (2) are calculated for each of the pixels of the image, and pixels having values higher than the threshold and pixels having values lower than the threshold are represented by a bit-map plane b(x,y) of zero or one.

FIG. 9C shows a bit-map plane b(x,y) with zero in black and one in white. The area where a trespasser is present is discriminated from the rest of the image. If b(x,y) in equation (2) are summed for all pixels within one frame, a total number of pixels different from the background is obtained.

$$s = \Sigma y \Sigma x b(x,y) \qquad (3)$$

If s is divided by the number of pixels in the entire frame, a ratio of the number of pixels different from the background to the entire image is obtained. Only when an incoming object having a size larger than a constant size is present within the surveillance system, the presence of the trespasser is detected.

In the object extraction method, the object image extractor 113 detects whether the trespasser is present within the surveillance system in the real-time video successively imaged and captured by the wide-angle camera 103. The object image extractor 113 thus determines whether to set the normal mode with no trespasser present or the trespasser tracking mode with a trespasser present.

A mode determination signal indicating either of the normal mode and the trespasser tracking mode is transmitted to the system controller 102. The mode determination signal is transmitted to the system controller 102 each time the object image extractor 113 determines the mode, i.e., each time the wide-angle camera 103 captures the image. Alternatively, the mode determination signal is transmitted to the system controller 102 at the moment the mode is transitioned (from the normal mode to the trespasser tracking mode or from the trespasser tracking mode to the normal mode) wherein the object image extractor 113 stores the current mode.

Data for controlling the zoom camera 104 may be substituted for the mode determination signal. Upon detecting the trespasser, the object image extractor 113 calculates a camera parameter to expand the video of the trespasser, and then send the camera parameter to the system controller 102. A simple determination method is thus implemented. Specifically, the mode is the normal mode when the system controller 102 receives no data, and is the trespasser tracking mode when the system controller 102 receives the data.

Several storage and transmission methods in the normal mode are contemplated depending on the capacity of a storage medium and bandwidth of a transmission line.

When no trespasser is present within the surveillance area i.e., during the normal mode, the image input to the object image extractor 113 for the wide-angle camera 103 is substantially identical to the background image stored in the background image generator 111. If the storage and transmission of the image are not required during the normal mode, there is no need for outputting the image to a compression encoder 115. Since no image processing is performed on the image, this is considered the most efficient encoding method.

When one frame of the background image is encoded first, the background image encoder 116 is used. The background image remains unchanged until a trespasser is detected. It suffices to encode one frame first. For example, to respond to variations in the background due to external light, the background image may be periodically updated. During the normal mode, it is not necessary for the zoom camera 104 to capture the image of any particular object. None of image processing is required on the captured image.

When the system is transitioned from the normal mode to the trespasser tracking mode, the system controller 102 commands the wide-angle camera 103 to continuously monitor the surveillance area while commanding the zoom camera 104 to start imaging.

Specifically, the system controller 102 requests the camera controller 107 to take the trespasser in an expanded image through the zoom camera 104 based on position information of the trespasser and image magnification transmitted from the object image extractor 113 as control parameters.

In response to the request, the camera controller 107 determines pan and tilt angles of the zoom camera 104 from the trespasser position information, and drives the panhead, thereby aiming the optical axis thereof at the position of the trespasser. As for the image magnification, a zooming operation is performed by moving a lens of the zoom camera 104 so that F becomes the focal length of the zoom camera 104 wherein F=Mf (M is an image magnification and f is the focal length of the wide-angle camera 103). The system controller 102 drives the video capturer 109 to receive a zoom camera image in the system.

The zoom camera 104 starts capturing the trespasser in an expanded image. While the trespasser is present within the surveillance system (during the trespasser tracking mode), the object image extractor 113 continuously transmits the position information of the trespasser and the magnification information to the system controller 102. The system controller 102 continuously requests the camera controller 107 to pan, tilt, and zoom the zoom camera 104 in accordance with the position of the trespasser and magnification. The zoom camera 104 thus tracks the trespasser.

During the trespasser tracking mode, the object image extractor 114 extracts the object by comparison of the video with the background image generated by the background image generator 112, and continuously outputs the comparison result to the arbitrary shape encoder 119. In response to the comparison result on the side of the wide-angle camera 103, the background image generator 112 generates and outputs a background image to the background image encoder 117.

Coordinates calculation to aim the zoom camera 104 at the trespasser will now be discussed.

Figure 10A:
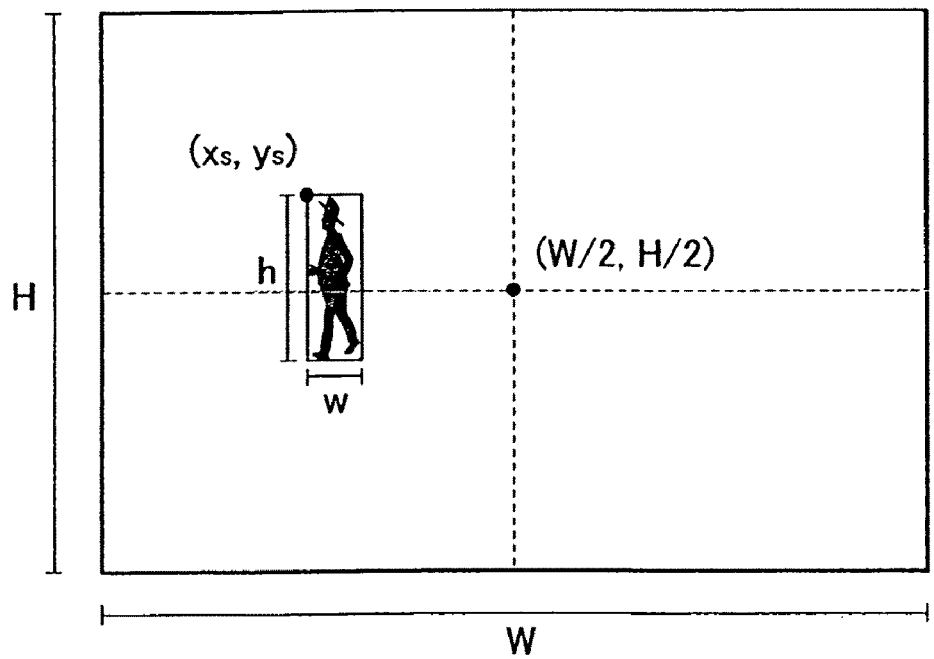
FIGS. 10A and 10B show a method of determining a position of an object and a zoom magnification in accordance with the first embodiment of the present invention.
Figure 10B:
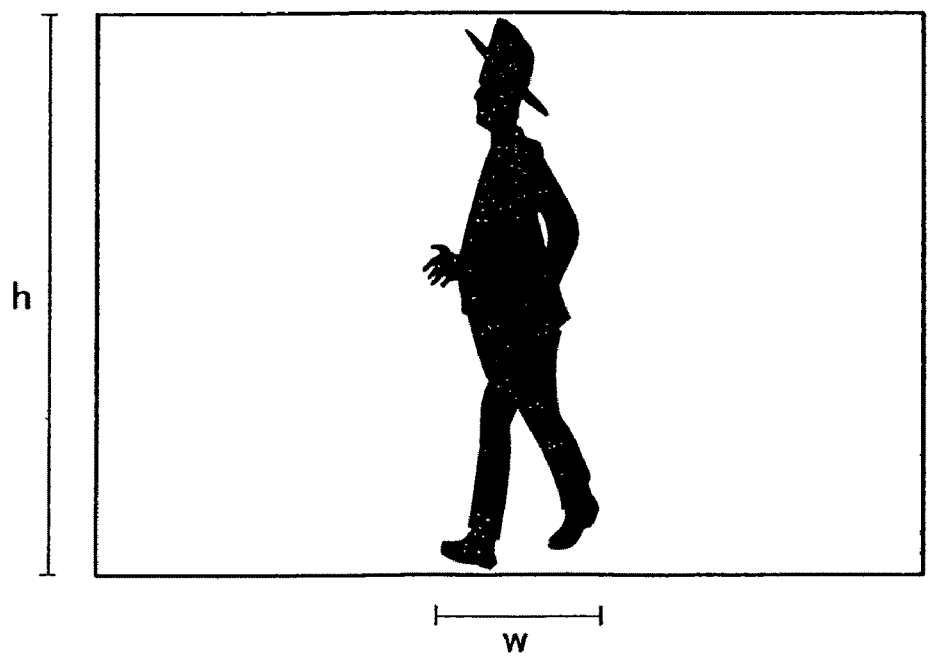

FIGS. 10A and 10B illustrate the determination method for determining the position of the trespasser and zoom magnification in the first embodiment.

FIG. 10A, corresponding to the bit-map image of the trespasser shown in FIG. 9C, shows the area of the trespasser in reverse video, namely, with the trespasser in black and the background in white.

The origin (0,0) of the coordinates is set to be at the top left corner of the screen corresponding to the wide-angle camera 103. The screen has a height H and a width W. The center of the optical axis of the wide-angle camera 103 is (W/2, H/2). A rectangular shape circumscribing the shape of the trespasser is set in shape information of the trespasser. Now, let (Xs,Ys) represent coordinates of the top left corner of the circumscribing rectangular shape, w represent the width of the rectangular shape, and h represent the height of the rectangular shape. The center of the circumscribing rectangular shape is (Xs+w/2, Ys+h/2).

A horizontal distance of travel Xm and vertical distance of travel Ym required to align the center of the optical axis of the zoom camera 104 to the center coordinates of the circumscribing rectangular shape are expressed by the following equations:

$$Xm = W/2 - (Xs+w/2) \qquad (4)$$

$$Ym = H/2 - (Xs+h/2) \qquad (5)$$

The unit of the distance of travel is in pixels. Let cx represent a horizontal camera parameter per pixel, and cy represent a vertical camera parameter. The horizontal distances of travel Cx and vertical distance of travel Cy are expressed by the following equations:

$$Cx = cx \cdot Xm \quad (6)$$

$$Cy = cy \cdot Ym \quad (7)$$

The determination method of determining the zoom camera magnification is discussed.

Displaying the image of the trespasser fully on the screen unit expanding the circumscribing rectangular shape to the size of the screen. Let Mw represent a horizontal magnification, and Mh represent a vertical magnification, and the following equations hold:

$$Mw = W/w \quad (8)$$

$$Mh = H/h \quad (9)$$

To prevent the circumscribing rectangular shape from over-extending beyond the screen, the smaller one of these magnifications is selected.

$$M = \text{Min}(Mw, Mh) \quad (10)$$

If M is greater than the maximum magnification Mmax, M=Max.

For understanding the present invention, the wide-angle camera 103 and zoom camera 104 are identical in specifications, such as the size of an opening and pitch of a CCD, except focal length. Although various differences are present between the two cameras in practice, it is assumed that the correction method for correcting the differences is known.

FIG. 10B shows an image which is obtained as a result of applying the camera control parameter determined in the above calculation to the control of the zoom camera 104.

When a trespasser comes into the surveillance system, the object image extractor 113 detects the trespasser. The detection method has already been discussed with reference to FIG. 10.

If the mode determination signal is used, the system is transitioned from the normal mode to the trespassing tracking mode. To encode the extracted object image, image data and shape data must be sent to the arbitrary shape encoder 118. The image data represents an area surrounded by the rectangular shape circumscribing the trespasser, and the shape data represents binary data within the circumscribing rectangular shape.

Data of the position and size of the circumscribing rectangular shape is also included. The data typically includes four parameters, i.e., the coordinates x and y at the top left corner of the circumscribing rectangular shape with respect to the origin placed at the top left corner of the screen, and width w and height h of the circumscribing rectangular shape. In the arbitrary shape encoding using the MPEG-4, a target encoding area is defined by a rectangular area called a bounding box. Requirements must be satisfied in the setup of the bounding box. If the circumscribing rectangular shape is extended to the bounding box, a pre-process in the encoding is eliminated.

The requirements in the setup of the bounding box are that the coordinates x and y at the top left corner of the bounding box be even numbers, and that each of the width and height of the bounding box be an integer multiple of 16.

FIGS. 11A-11E show a method of generating a background image of the zoom camera 104 in accordance with the first embodiment of the present invention.

Figure 11A:
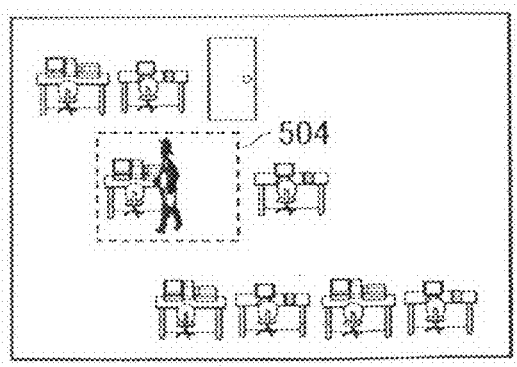
FIGS. 11A-11E show a method of generating a background image of a zoom camera in accordance with the first embodiment of the present invention.
Figure 11D:
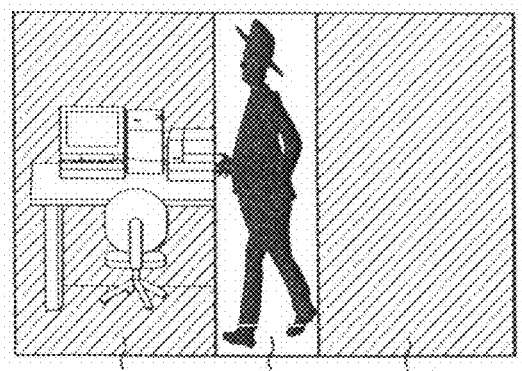

FIG. 11A shows an image captured by the wide-angle camera 103. As shown, a box 504 defined by a dotted line indicates an area to be expanded obtained in the determination of the trespasser position and zoom camera magnification. FIG. 11C shows an expanded image captured by the zoom camera 104. To extract and encode the trespasser only, the background image is required as already discussed. In the first embodiment, the background image of the zoom camera 104 is not prepared beforehand, but is generated based on the background generated in the side of the wide-angle camera 103 and information obtained by extracting the object on the side of the wide-angle camera 103.

Specifically, the background image most appropriate for the image captured by the zoom camera 104 is extracted and expanded from the background image of the wide-angle camera 103, based on the information of the position coordinates of the top left corner of and the size of the circumscribing rectangular shape set in the image captured by the wide-angle camera 103.

Figure 11B:
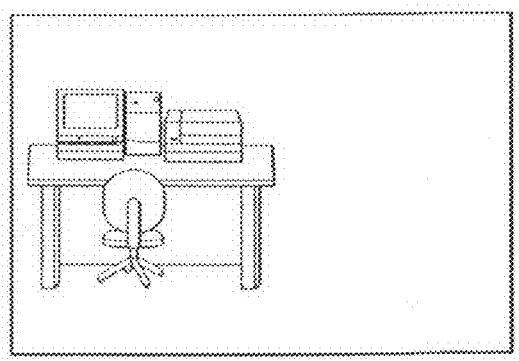

FIG. 11B shows an image which is obtained by extracting the same area from the background image (see FIG. 9A) captured by the wide-angle camera 103 as the one shown in FIG. 11A and by expanding the area through image processing.

The background image, generated by expansion through the image processing, is not identical to the background image shown in FIG. 11C, and lacks a high frequency component. But an erroneous determination due to a background difference is improved performing a post-processing operation.

In FIG. 11D, regions 501 and 502 having no object within occur if the aspect ratio of the circumscribing rectangular shape is different from the aspect ratio of the screen. Extraction precision may be improved using isolated point removal and filtering process applied to a region 503.

Figure 11E:
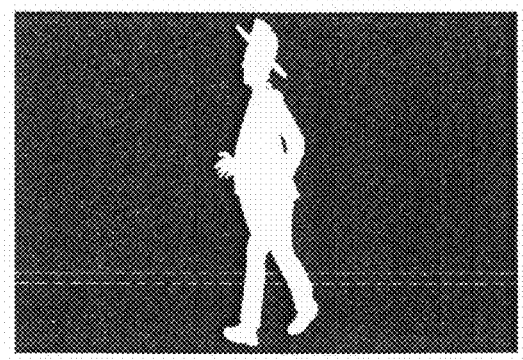
Figure 11C:
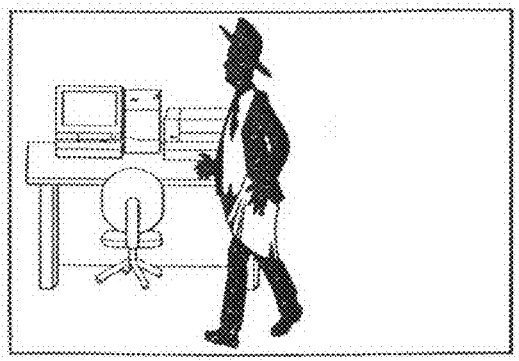

FIG. 11E shows an extraction result of the object. Data input to the arbitrary shape encoder 119 includes the image data and shape data obtained from the object image extractor 114. Details of the data remain unchanged from those discussed in connection with the wide-angle camera 103.

Since the background image varies in response to the movement of the camera on the side of the zoom camera 103, the background image encoder 117 preferably utilizes the moving picture encoding technique. In the first embodiment, the MPEG-4 encoding method is used. Since the MPEG-4 handles a rectangular shape, not an arbitrary shape, on a frame by frame basis, the whole compression encoder 115 is set to work in compliance with the MPEG-4.

In the first embodiment, the MPEG-4 arbitrary shape encoding method is used as an object unit encoding method. In the MPEG-4 arbitrary shape encoding method, an image signal, shape signal, and transmittance signal at the same pixel position form one macro block, and the image is encoded on a per macro block basis. To perform the arbitrary shape encoding, a region called bounding box containing an object therewithin is set up, and coordinates of the top left corner of and the size of the bounding box are encoded together.

The shape signal is a binary signal with the interior of the object defined as being 255, and the exterior of the object defined as being 0. In the first embodiment, the object is the trespasser, and the bounding box is easily set up based on the extraction result from the object image extractors 113 and 114. The transmittance signal is not used for an object other than semi-transparent objects, and is thus not used in the first embodiment.

Figure 12A:
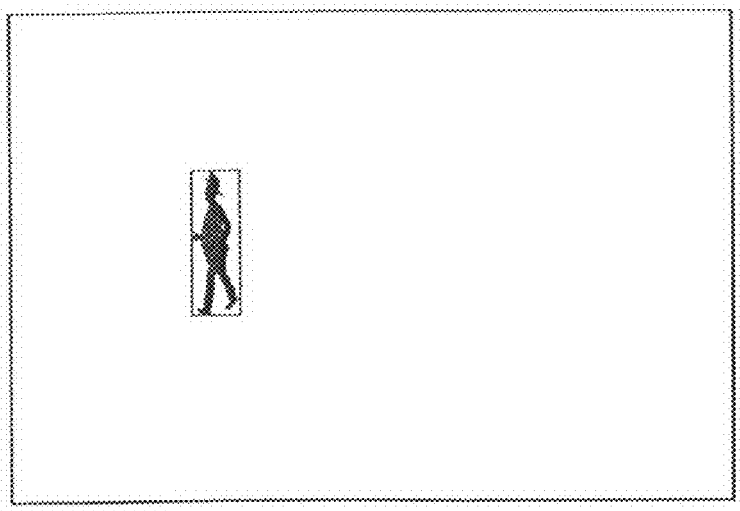
FIGS. 12A-12C show a bounding box of an object and macro blocks in accordance with the first embodiment of the present invention.
Figure 12B:
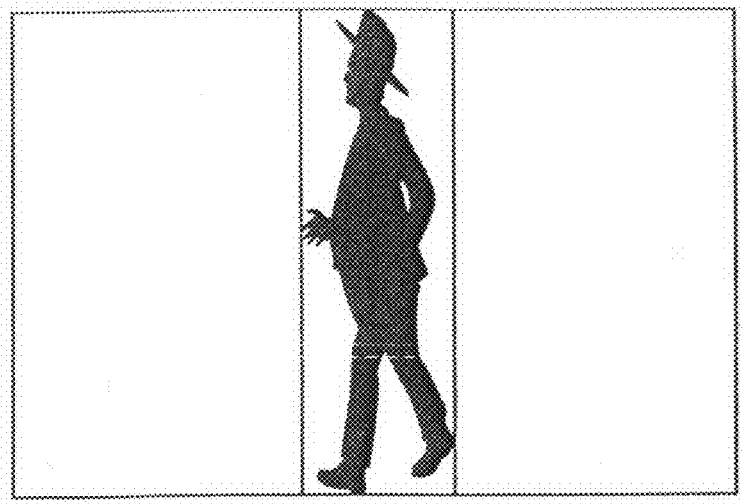
Figure 12C:
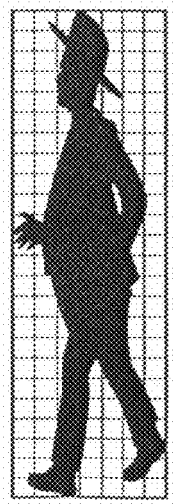

FIGS. 12A-12C show the bounding box and macro blocks of the object in accordance with the first embodiment of the present invention.

FIG. 12A shows the bounding box in the image on the side of the wide-angle camera 103, and FIG. 12B shows the bounding box in the image on the side of the zoom camera 104. FIG. 12C shows macro blocks into which the bounding box is segmented.

The encoding process of each macro block is discussed with reference to FIG. 17.

Figure 17:
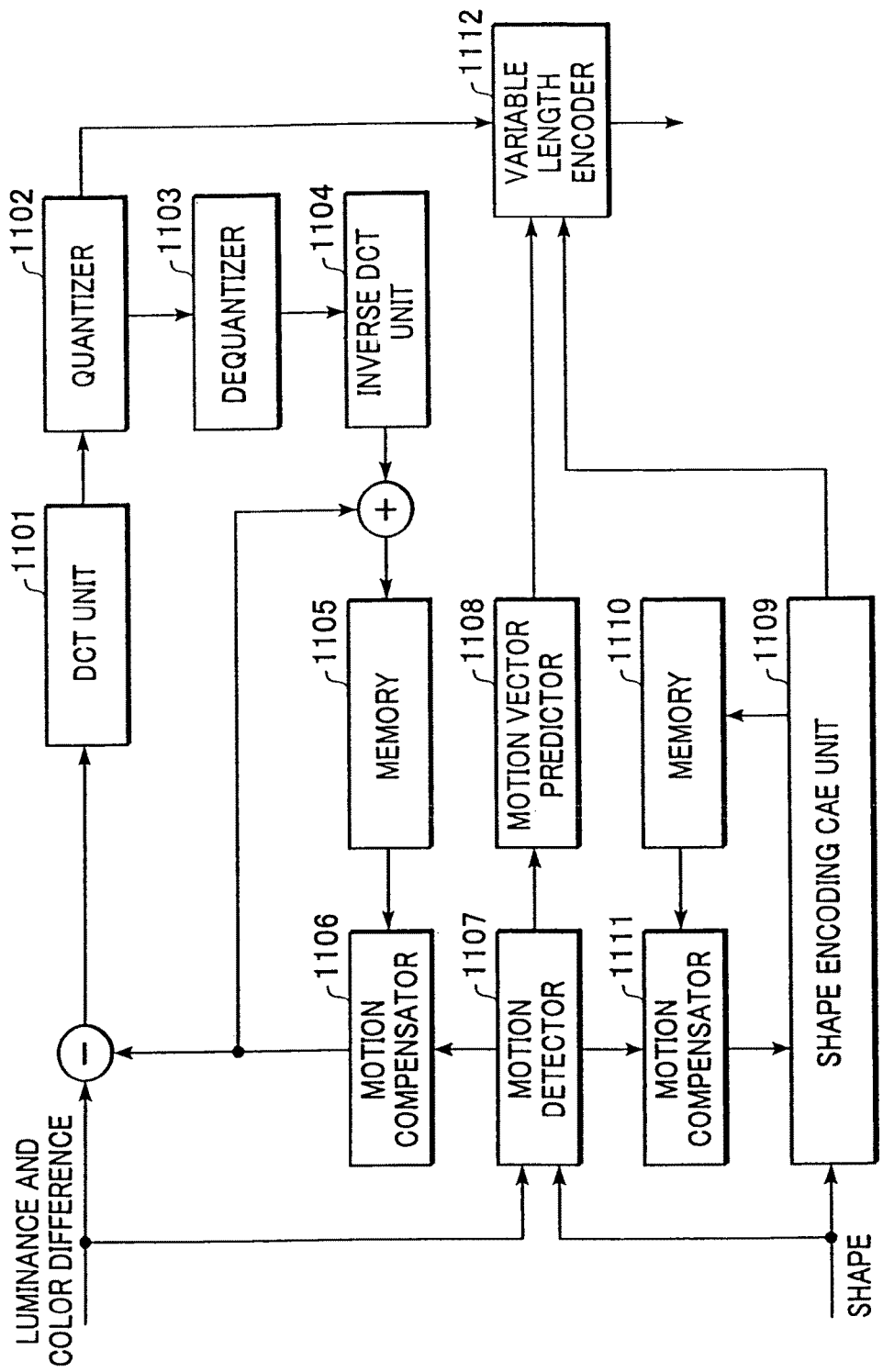
FIG. 17 is a block diagram of an arbitrary shape encoder in accordance with the second embodiment of the present invention.

FIG. 17 is a block diagram of an arbitrary shape encoder in accordance with the second embodiment of the present invention.

As shown, input signals include luminance and color difference signal of an image and shape signal, and are processed on a macro block by macro block basis. The interior region of the object represented by the shape signal and transmittance signal is called a VideoObjectPlane (VOP).

In an intrapicture encoding mode, each block is discrete cosine transformed (DCT) by a DCT unit 1101, and quantized by a quantizer 1102. Quantized DCT coefficients and quantization width are variable-length encoded by the background image generator 112.

In an interpicture encoding mode, a motion detector 1107 detects a motion from a next VOP adjacent in time using a motion detection method such as a block matching, and a motion vector predictor 1108 detects a predictive macro block having the smallest error with respect to a target macro block. A signal indicating a motion to the predictive macro block having the smallest error is a motion vector. An image referenced to generate the predictive macro block is referred to as a reference VOP. Based on a detected motion vector, a motion compensator 1106 compensates for a motion in the reference VOP, thereby acquiring an appropriate predictive macro block.

A difference between a next target macro block and a predictive macro block corresponding to the next target macro block is determined. The difference signal is then discrete cosine transformed by the DCT unit 1101, and the DCT transform coefficients are then quantized by the quantizer 1102.

The shape data is encoded by a shape encoding Context-based Arithmetic Encoding (CAE) unit 1109. Boundary blocks only are encoded using CAE encoding. As for the blocks within and outside the VOP, header information only is transmitted to a variable-length encoder 1112. Like the image data, motion in the boundary blocks to be CAE encoded are detected by the motion detector 1107 in the interpicture encoding mode and the output of the motion detector 1107 is input to the motion vector predictor 1108 for motion vector prediction. A difference between motion-compensated shape data and shape data of a preceding frame is CAE encoded.

Input to the mutliplexer 120 from the background image encoder 116 during the normal mode is a bit-stream which is the output from the background image encoder 116.

Input to the mutliplexer 120 during the trespasser tracking mode is, in addition to the bit-stream of the background image output from the background image encoder 116, bit stream from the arbitrary shape encoder 118 on the side of the object image extractor 113, bit stream from the background image encoder 117 on the side of the zoom camera 104, and bit stream from the arbitrary shape encoder 119 on the side of the zoom camera 104. Required synchronization control is carried out by the system controller 102 in a multiplexing operation.

FIG. 8 is a block diagram of an image decoder of the surveillance system in accordance with the first embodiment of the present invention.

As shown, an operation unit 201 and system controller 202 correspond to the operation unit 101 and system controller 102 shown in FIG. 7, respectively.

A demultiplexer 203 demultiplexes the multiplexed encoded data stream into encoded bit streams. A decompression decoder 204 decodes the compressed data, and includes a background image decoder 205 for performing an operation inverse to the operation of the background image encoder 116 shown in FIG. 7, an arbitrary shape decoder 207 for performing an operation inverse to the operation of the arbitrary shape encoder 118 shown in FIG. 7, a background image decoder 206 for performing an operation inverse to the operation of the background image encoder 117 shown in FIG. 7, and arbitrary shape decoder 208 for performing an operation inverse to the operation of the arbitrary shape encoder 119 shown in FIG. 7.

A synthesizer unit 209 synthesizes an object, only the object area of which is object unit encoded, and the background. A display 212 is used to monitor an image.

The operation of the surveillance system constructed as shown in FIG. 8 is discussed below.

The demultiplexer 203 demultiplexes the multiplexed bit streams. During the trespasser tracking mode, four types of bit streams formed of background image encoded bit streams and arbitrary shape encoded bit streams corresponding to the wide-angle camera 103 and zoom camera 104 shown in FIG. 7. During the normal mode, only the background image encoded bit stream of the wide-angle camera side is present.

Bit streams demultiplexed by the demultiplexer 203 are decoded by respective decoders. Each decoder performs an operation inverse to the operation of the corresponding encoder. If the MPEG-4 arbitrary shape encoder is used for encoding, an MPEG-4 arbitrary shape decoder must be used for decoding. The decoding operation of the macro block in the bounding box is discussed with reference to FIG. 18.

Figure 18:
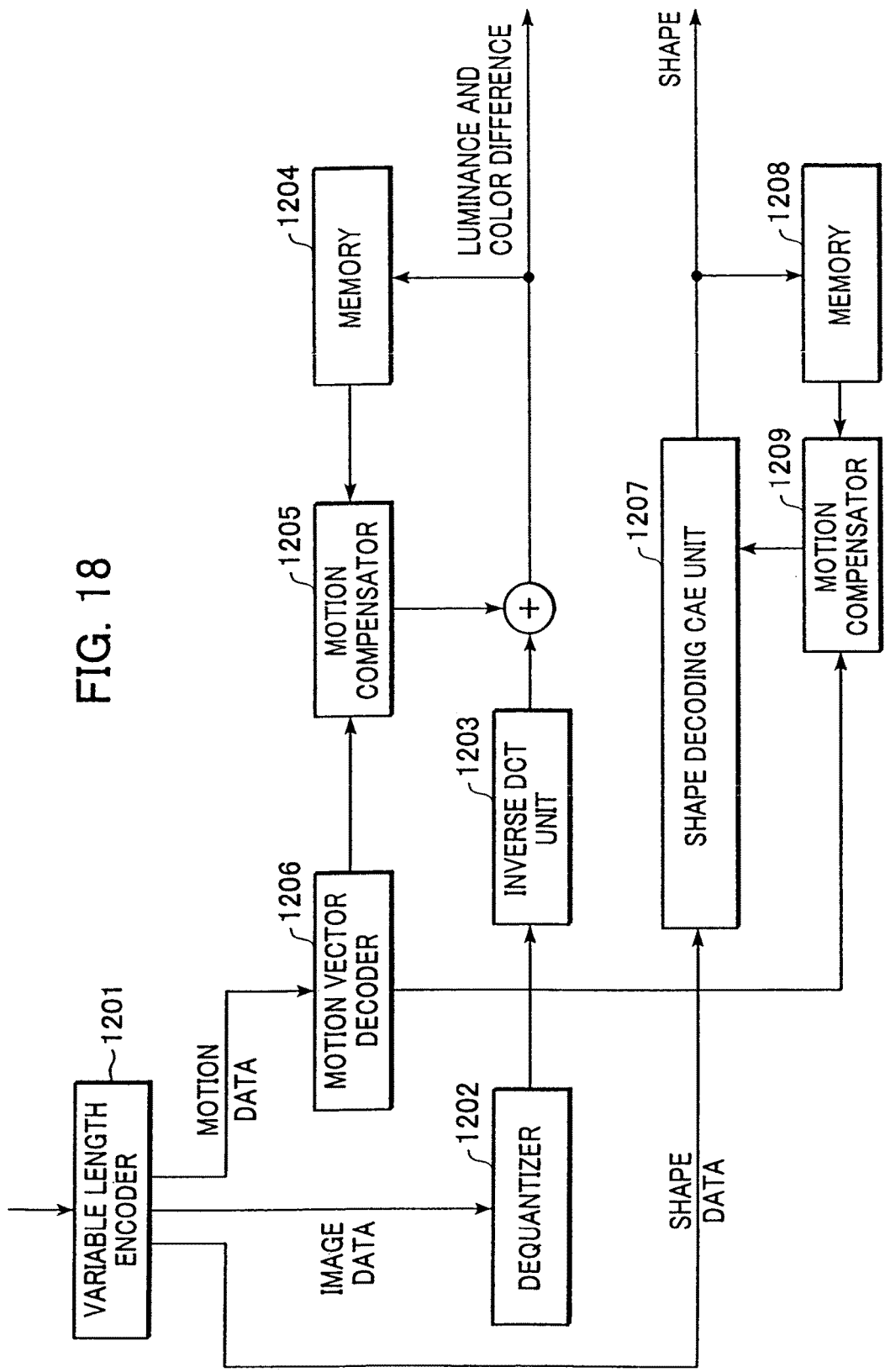
FIG. 18 is a block diagram of an arbitrary shape decoder in accordance with the second embodiment of the present invention.

FIG. 18 is a block diagram of an arbitrary shape decoder in accordance with the second embodiment of the present invention.

As shown, the encoded bit stream is decoded by a variable-length decoder 1201. The bit stream is thus separated into image, shape and motion data.

In the intrapicture encoding mode, the DCT coefficients are dequantized by a dequantizer 1202, and are then decoded into image signals of luminance and color difference by the inverse DCT unit 1203. Likewise, the shape data is decoded into source shape data by a shape decoding CAE unit 1207. The CAE decoding is performed on boundary blocks only. As for the blocks within and outside the VOP, the original image data is decoded from the header information only.

In the interpicture encoding mode, a motion vector decoded by a motion vector decoder 1206 is used to decode an original image from a difference image with respect to a preceding image. The image data referenced during the decoding operation is an image that is determined in the same process as padding during the encoding operation. The shape data is similarly difference CAE decoded, resulting in original shape data.

Returning to the discussion of the operation of the surveillance system shown in FIG. 8, the synthesizer unit 209 synthesizes the background image and arbitrary shape image, the image of the trespasser, which are separately decoded, thereby generating a sequence of moving images. Two sequences of the moving images of the wide-angle camera 103 and the moving images of the zoom camera 104 are generated.

Image synthesizers 210 and 211 are different in terms of whether to synthesize the image of the wide-angle camera 103 or the image of the zoom camera 104. There is no substantial difference in function therebetween.

A display 212 displays two types of surveillance images of the wide-angle camera 103 and zoom camera 104 in an easy-to-see fashion. The two types of images may be displayed on separate monitors or may be displayed on a plurality of windows on a single monitor at the same time. When surveillance is performed using a variety of display methods, a display method is elected from the operation unit 201 through the system controller 202.

FIGS. 13A-13G shows examples of the display methods. All examples shown are in the trespasser tracking mode.

Figure 13A:
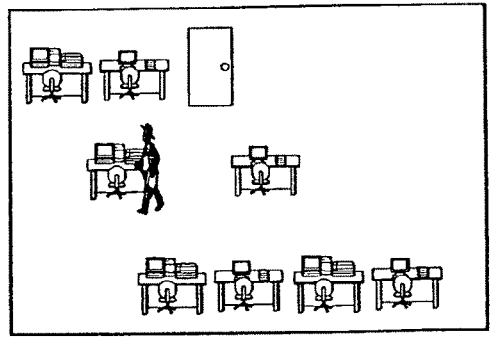
FIGS. 13A-13G shows displays on a display unit in the first embodiment of the present invention.

FIG. 13A shows a synthesized decoded image. In this display, a background decoded image of the wide-angle camera 103 and a trespasser decoded image of the wide-angle camera 103 are synthesized.

Figure 13E:
Figure 13B:
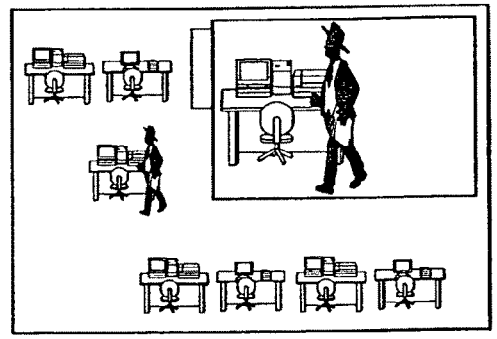

FIG. 13B shows a display example in which the synthesized decoded image of the zoom camera 104 is overlaid on the synthesized decoded image of the wide-angle camera 103. As the synthesized decoded image of the wide-angle camera 103, the synthesized decoded image of the zoom camera 104 is formed of the background decoded image of the zoom camera 104 and the trespasser decoded image of the zoom camera 104.

Figure 13F:
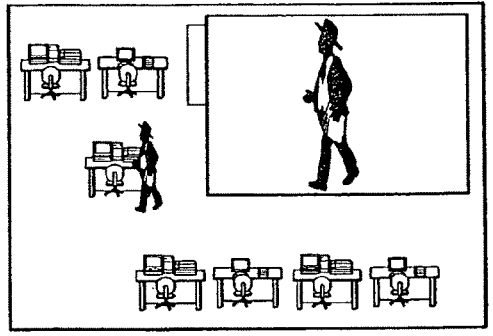
Figure 13C:
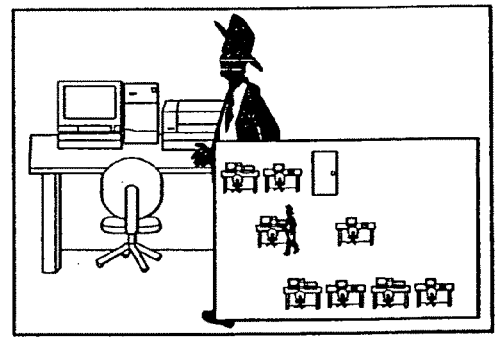

FIG. 13C shows a display example in which the synthesized decoded image of the wide-angle camera 103 is overlaid on the synthesized decoded image of the zoom camera 104. The user can concurrently watch information about the location of the trespasser and zoomed-in image of the trespasser in the entire surveillance area.

Figure 13G:
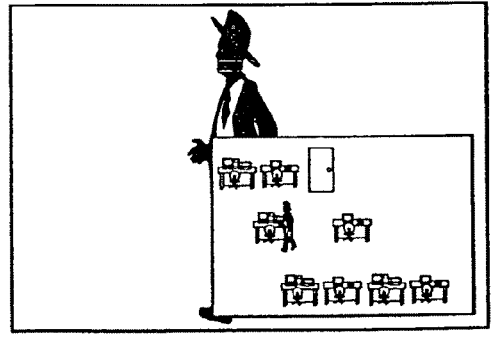
Figure 13D:
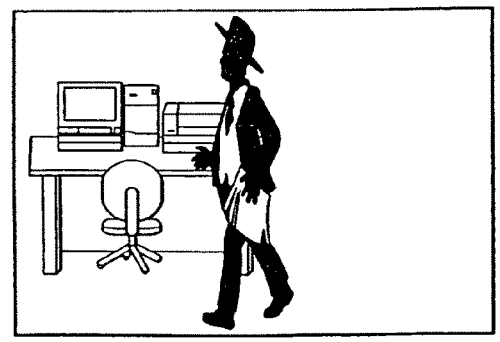

FIG. 13D shows only a synthesized decoded image of the zoom camera 104. If the user desire to watch the trespasser only, a decoded image of the trespasser only may be presented as shown in FIG. 13E. This display may be constructed by allowing the operation unit 201 to control the image synthesizer 211 through the system controller 202 not to synthesize the background image.

FIG. 13F shows a display example in which the trespasser decoded image shown in FIG. 13E is overlaid on the synthesized decoded image of the wide-angle camera 103.

Figure 14:
FIG. 14 shows a display in accordance with the first embodiment of the present invention.

FIG. 13G shows a display example in which the synthesized decoded image of the wide-angle camera 103 is overlaid on the synthesized decoded image of the zoom camera 104. FIG. 14 shows the example of a display device.

In the second embodiment, the background image of the zoom camera is generated on the decoder side so that no background image of the zoom camera is transmitted. This arrangement eliminates the amount of code to be transmitted.

Figure 15:
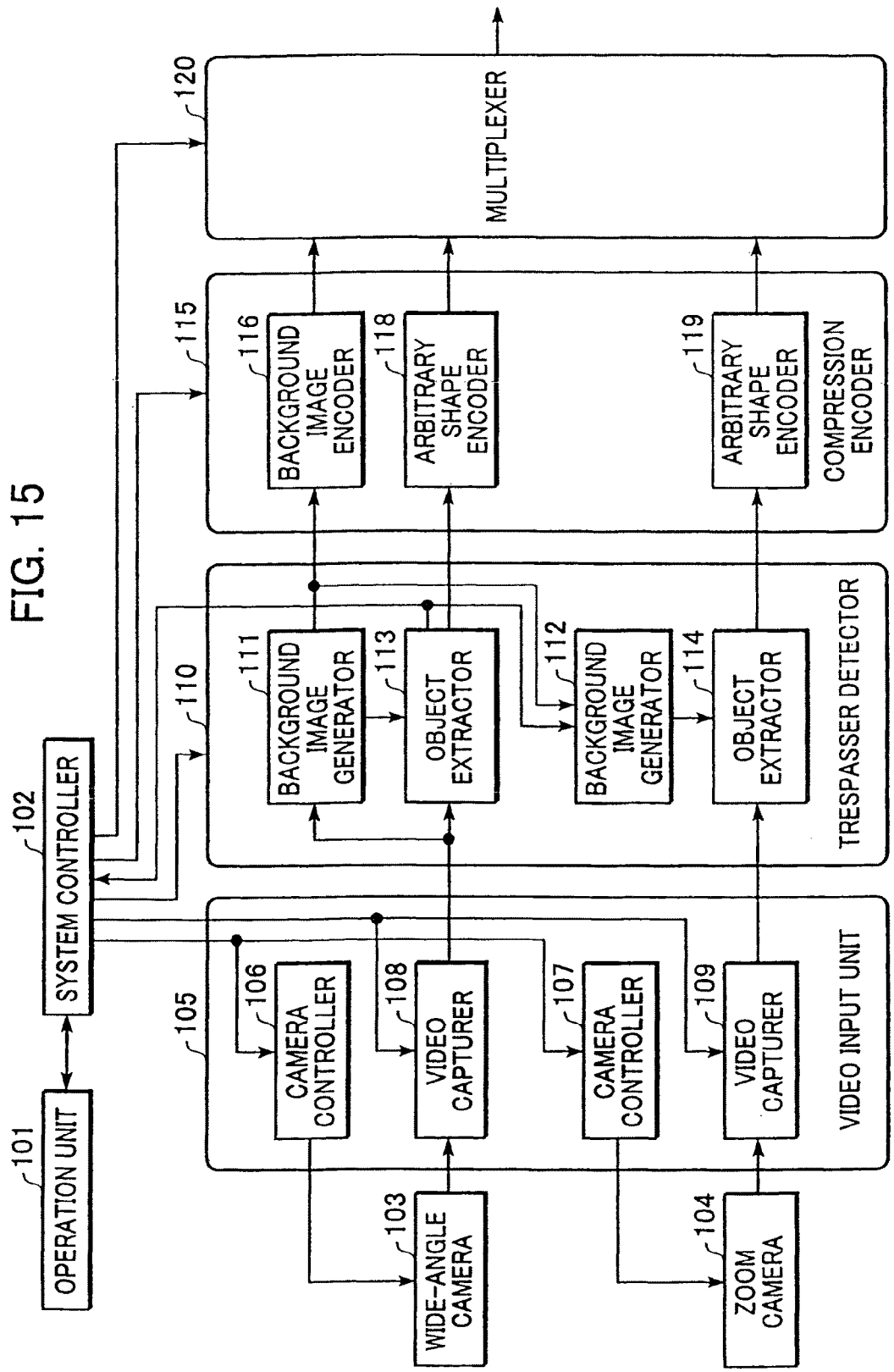
FIG. 15 is a block diagram of an image encoder of a surveillance system in accordance with the second embodiment.

FIG. 15 is a block diagram of an image encoder of a surveillance system in accordance with the second embodiment of the present invention. In FIG. 15, components identical in function to those discussed with reference to FIG. 7 are designated with the same reference numerals, and the discussion thereof is omitted here.

The system shown in FIG. 15 is different from the system shown in FIG. 7 in that the background image generated by the background image generator 112 for the zoom camera 104 is used as a reference for comparison only in the object image extractor 114 and is not transmitted to the background image encoder 117. The background image encoder 117 shown in FIG. 7 is thus omitted in FIG. 15.

The number of types of bit streams handled by the mutliplexer 120 in FIG. 15 is reduced by one. The mutliplexer 120 thus handles three types of bit-streams, the background encoded bit stream, the arbitrary shape encoded bit-stream of the wide-angle camera 103, and the arbitrary shape encoded bit stream of the zoom camera 104. As in the first embodiment, the three types of bit-streams are multiplexed during the trespasser tracking mode.

Figure 16:
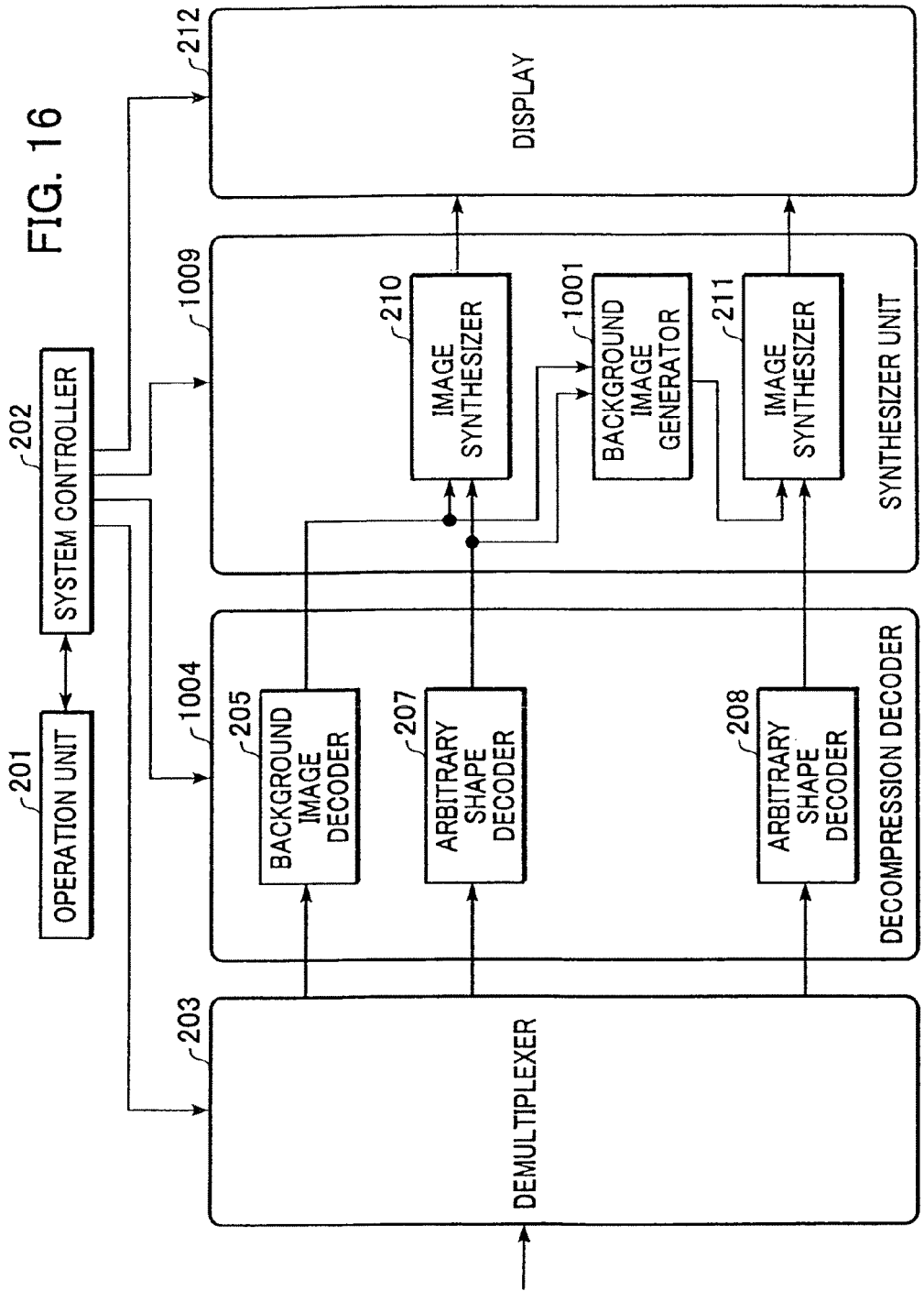
FIG. 16 is a block diagram of an image decoder of the surveillance system in accordance with the second embodiment.

FIG. 16 is a block diagram of an image decoder of the surveillance system in accordance with the second embodiment. In FIG. 16, components identical in function to those discussed with reference to FIG. 8 are designated with the same reference numerals and the discussion thereof is omitted here.

During the trespasser tracking mode, the demultiplexer 203 demultiplexes the multiplexed bit streams into the background encoded bit stream and arbitrary shape encoded bit stream of the wide-angle camera 103, and the arbitrary shape encoded bit stream of the zoom camera 104.

As in the first embodiment, the background image decoder 205 decodes the background image encoded bit stream into the background image, and the arbitrary shape decoder 207 decodes the arbitrary shape encoded bit stream into an arbitrary shape image in the process on the side of the wide-angle camera 103. The image synthesizer 210 synthesizes respective decoded image data into a decoded image.

In the process of the side of the zoom camera 104, the arbitrary shape decoder 208 decodes the arbitrary shape bit stream into an arbitrary shape image. Unlike the first embodiment, the second embodiment does not decode the background image of the zoom camera 104. The background image is generated from the decoded data of the wide-angle camera 103.

The background image obtained from the background image decoder 205 on the side of the wide-angle camera 103 as shown in FIG. 9A is fed to the background image generator 1001. The arbitrary shape decoder 207 outputs information about the position and size of a decoded image having an arbitrary shape. The information is also fed to the background image generator 1001. In response to the two inputs, the background image generator 1001 expands a portion of the background image of the wide-angle camera 103 through image processing, thereby resulting in a background image of the zoom camera 104 as shown in FIG. 11B.

The background image of the zoom camera 104 generated by the background image generator 1001 is input to the image synthesizer 211 together with the arbitrary shape decoded image output from the arbitrary shape decoder 208. The image synthesizer 211 synthesizes the two inputs. The synthesized image becomes something like the one shown in FIG. 11C. The second embodiment provides the same result as the one presented in the first embodiment.

Although hardware forming a network is included in accordance with each of the above-referenced embodiments, each process may be performed using a software program. A storage medium storing program codes of the software program for performing the function of the present embodiments may be supplied in a system or apparatus, and a computer (a CPU or an MPU) of the system or apparatus may read and execute the program codes stored in the storage medium. In this arrangement, the object of the present invention is achieved. The program codes read from the storage medium perform the function of each of the above-referenced embodiments, and the storage medium storing the program codes falls within the scope of the present invention.

The function of the embodiments is performed when the computer executes the read program. Furthermore, the function of the embodiments is performed when an operating system (OS) running on the computer performs an actual process in whole or in part in response to the instructions of the program codes. Such an arrangement also falls within the scope of the present invention.

The program codes read from the storage medium are stored in a memory in a feature expansion board or a feature expansion unit connected to the computer. A CPU mounted on the feature expansion board or the feature expansion unit performs partly or entirely the actual process in response to the instruction from the program codes. The function of the embodiments is thus performed through the process. Such an arrangement falls within the scope of the present invention.

In accordance with the present invention, the plurality of image pickup devices having different image magnifications are used. The image pickup device having the low image magnification images the position of the trespasser and the environment surrounding the trespasser within the surveillance area. The image pickup device having a high image magnification captures an expanded image on which the user recognizes the appearance of the trespasser. The video signals from these cameras are compression encoded taking into consideration the object unit encoding in accordance with the characteristics of the video signals. The expanded image of the trespasser is obtained at a sufficiently high definition in comparison with a surveillance system that uses a wide-angle lens such as a fisheye lens.

In comparison with a system that monitors a background image using a plurality of image pickup devices, the use of the wide-angle camera to monitor a wide area reduces the number of image pickup devices, leading to a reduction in costs.

Since the zoom camera captures the expanded image of the trespasser, the user is free from a great deal of effort required to construct an appropriate environment including the maximum effective expansion rate effective for recognizing the object image, focal length of the camera (or the field of view), and distance between installed cameras, depending on monitoring positions and recognition precision in recognizing the trespasser.

Unlike the conventional system that uses a plurality of cameras having different image magnifications, only both the background and the object area in each of the wide-angle camera image and the zoom camera image are encoded. The amount of code is significantly reduced, and a high-performance surveillance system results. If the surveillance system of the present invention includes a storage system, a longer surveillance time is permitted compared with the conventional system. If the surveillance system of the present invention includes a transmission system, the image is transmitted within a narrower ban-d without degrading video quality. Given the same transmission bandwidth as the conventional art, a higher quality video is transmitted.

Since the background image of the zoom camera is generated on the decoder side in the second embodiment, a further reduction in the amount of code is achieved. A highly efficient surveillance system results.

Since the background image of the image data having a high magnification is generated from the image data having a low magnification, the amount of code of the image data is significantly reduced.

When the object image of the image data having a high image magnification is extracted using the background difference method, the background image is generated based on the image data having a low magnification, and the object image is extracted. This arrangement eliminates the need for preparing the background image beforehand. The surveillance system is easier to operate.

Since the background image of the image data having a high image magnification is generated through the process on the decoder side, a further reduction in the amount of code is achieved.

Since image capturing is performed at the camera angle and zoom magnification determined by the position and size of the object, the expanded image of the object is easy to obtain.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An image processing apparatus comprising:
    an input unit for inputting a first background image captured at a predetermined image magnification, a first object image extracted from image data captured at the predetermined image magnification, and a second object image extracted from image data captured at an image magnification higher than the predetermined image magnification;
    a background image generating unit for generating a second background image corresponding to the second object image based on the first background image and the first object image; and
    an image synthesizing unit for synthesizing the second background image and the second object image.

2. An image processing apparatus according to claim 1, wherein the image synthesizing unit synthesizes the first background image and the first object image.

3. An image processing apparatus according to claim 1, wherein the first object image is a rectangular shaped image containing a shape of an object within, and further wherein the input unit also inputs information representing a position and a height and width of the rectangular area within a screen.

4. An image processing apparatus according to claim 3, wherein the background image generating unit determines an expansion rate from the height and width of the rectangular area and the size of the screen, and generates the second background image by expanding the first background image at the expansion rate.

5. An image processing apparatus according to claim 4, wherein the background image generating unit determines, as the expansion rate, a maximum image magnification at which the rectangular area, when expanded, fills the screen.

6. An image processing apparatus according to claim 1, wherein the first background image, the first object image, and the second object image, each input by the input unit, are encoded, and further wherein the input unit comprises decoding unit for decoding each of the first background image, the first object image, and the second object image.

7. An image processing apparatus according to claim 1, further comprising a display unit for displaying an image synthesized by the image synthesizing unit.

8. An image processing method comprising the steps of:
    inputting a first background image captured at a predetermined image magnification, a first object image extracted from image data captured at the predetermined image magnification, and a second object image extracted from image data captured at an image magnification higher than the predetermined image magnification;

generating a second background image corresponding to the second object image based on the first background image and the first object image; and synthesizing the second background image and the second object image.

9. A non-transitory computer-readable storage medium which stores computer-executable instructions, the computer-executable instructions being for processing an image, said computer executable instructions causing a computer to execute the steps of:

inputting a first background image captured at a predetermined image magnification, a first object image extracted from image data captured at the predetermined image magnification, and a second object image extracted from image data captured at an image magnification higher than the predetermined image magnification;

generating a second background image corresponding to the second object image based on the first background image and the first object image; and synthesizing the second background image and the second object image.

* * * * *